(12) United States Patent
Sakamoto

(10) Patent No.: US 6,279,079 B1
(45) Date of Patent: Aug. 21, 2001

(54) PROGRAM EXECUTION SYSTEM WITH EFFICIENT CODE DUPLICATION

(75) Inventor: Mamoru Sakamoto, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/440,933

(22) Filed: Nov. 16, 1999

(30) Foreign Application Priority Data

Jun. 4, 1999 (JP) .................................. 11-158594

(51) Int. Cl.[7] ........................................ G06F 12/00
(52) U.S. Cl. ........................................... 711/133
(58) Field of Search .............................. 711/118, 133, 711/134, 135, 136

(56) References Cited

FOREIGN PATENT DOCUMENTS

| 3-175545 | 7/1991 | (JP) . |
| 4-205535 | 7/1992 | (JP) . |

*Primary Examiner*—Kevin Verbrugge
(74) *Attorney, Agent, or Firm*—Burns, Doane, Swecker & Mathis, LLP

(57) ABSTRACT

A duplicate of a function code is created in a fast memory contiguous with a normal memory so that a CPU checks whether the duplicate is located in the fast memory when the function code is called; and a block containing a function code may be released so as to create therein a duplicate of a new function code.

6 Claims, 35 Drawing Sheets

(f) EXECUTION MARK SETTING PROCESS (k) EXECUTION DETERMINATION PROCESS (g) EXECUTION MARK RELEASE PROCESS (c) HIT DETERMINATION PROCESS given : F  ADDRESS OF FUNCTION CODE TO BE EXECUTED
out : X  INDICATOR INDICATING WHETHER A HIT HAS OCCURRED
       C  ADDRESS OF DUPLICATE CODE AT F (WHEN A HIT HAS OCCURRED)

(e) CODE DUPLICATION PROCESS given : P  ALLOCATED MEMORY BLOCK
　　　　F  COPIED FUNCTION CODE (h) RETURN PROCESS (j) PURGE PROCESS (I) MEMORY RELEASE PROCESS given : P  ADDRESS OF MEMORY BLOCK TO BE RELEASED

FIG.11

(a) SAMPLE PROGRAM

```
F1 ( )
{
        F2 (2) ;

}

F2 (i)
{
        if (i > 0) }
             F2 (i-1) ;
        } else }
             F3( ) ;
             F4( ) ;
        }
}
```

FIG.12
STATUS CHANGE IN FAST MEMORY
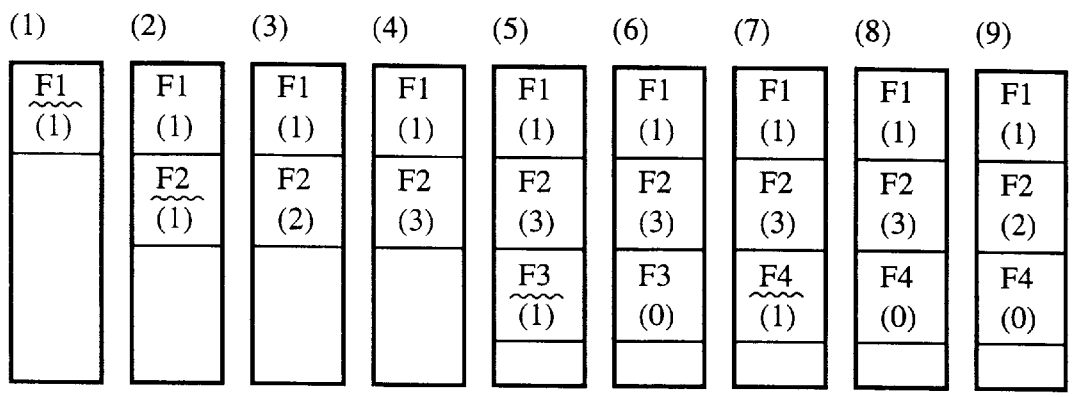
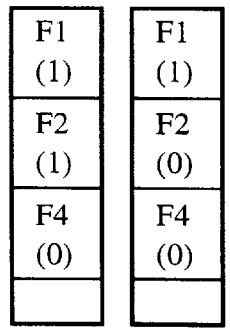
( ) NUMBER IN PARENTHESES
INDICATES EXECUTION COUNT
(1) CALL F1
(2) CALL F2 (FROM F1)
(3) CALL F2 (FROM F2)
(4) CALL F2 (FROM F2)
(5) CALL F3 (FROM F2)
(6) RETURN TO F2 (FROM F3)
(7) CALL F4 (FROM F2)
(8) RETURN TO F2 (FROM F4)
(9) RETURN TO F2 (FROM F2)
(10) RETURN TO F2 (FROM F2)
(11) RETURN TO F1 (FROM F2)

FUNCTION CALL LIST (m) DATA STRUCTURE OF FUNCTION CALL LIST (f) EXECUTION MARK SETTING PROCESS

FIG.16A
(g) EXECUTION MARK RELEASE PROCESS
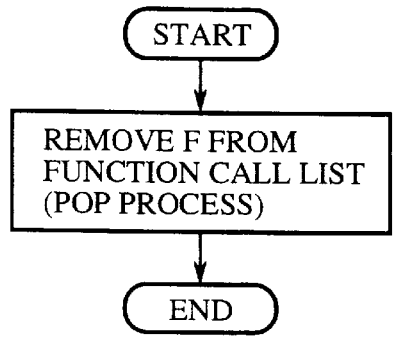
FIG.16B
(k) EXECUTION DETERMINATION PROCESS
FIG.17
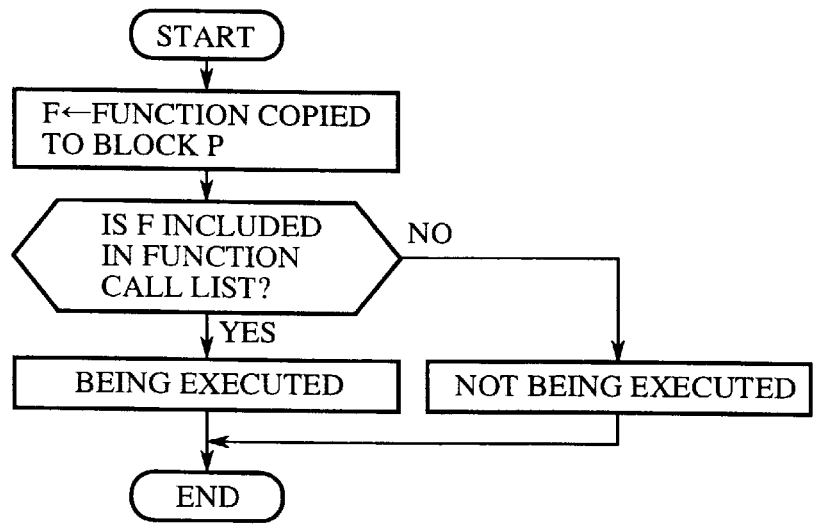

FIG. 18
STATUS CHANGE IN FAST MEMORY
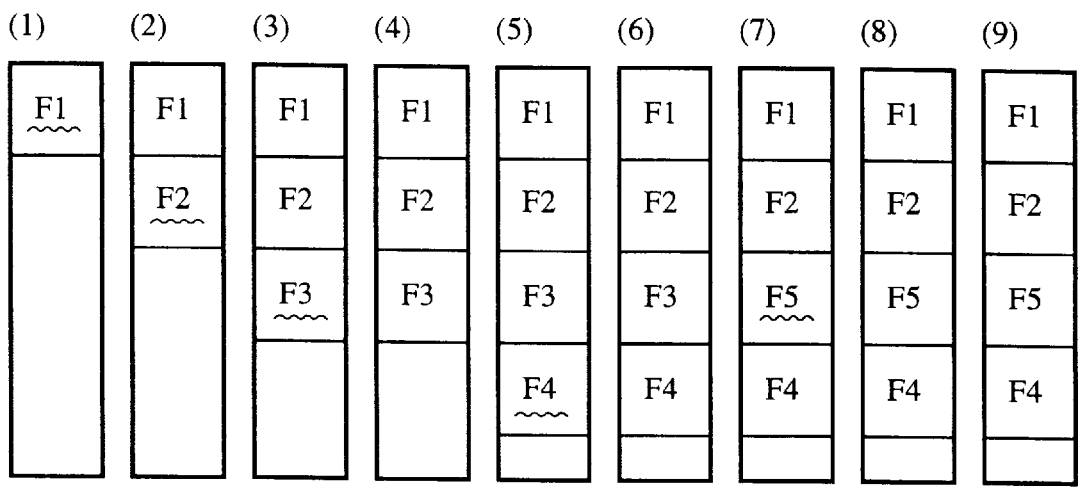
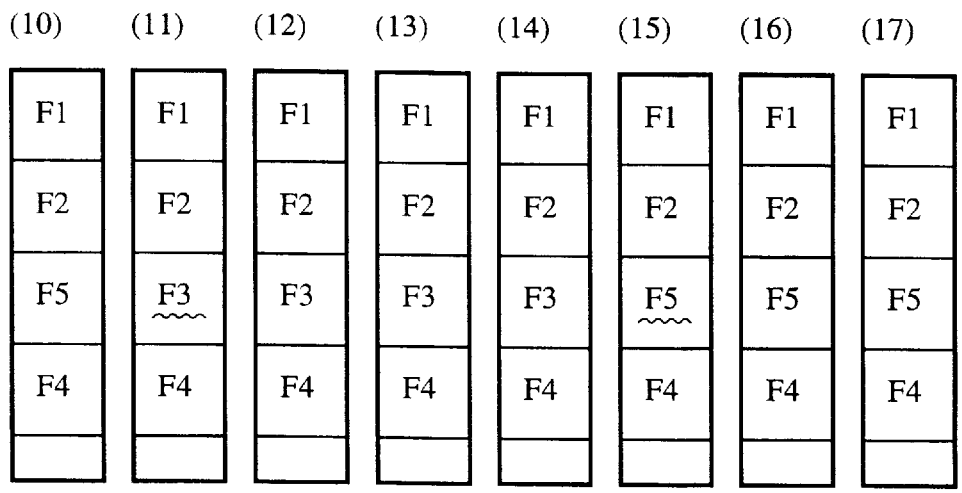
(1) CALL F1
(2) CALL F2 (FROM F1)
(3) CALL F3 (FROM F2)
(4) RETURN TO F2 (FROM F3)
(5) CALL F4 (FROM F2)
(6) RETURN TO F2 (FROM F4)
(7) CALL F5 (FROM F2)
(8) RETURN TO F2 (FROM F5)
(9) RETURN TO F1 (FROM F2)
(10) CALL F2 (FROM F1)
(11) CALL F3 (FROM F2)
(12) RETURN TO F2 (FROM F3)
(13) CALL F4 (FROM F2)
(14) RETURN TO F2 (FROM F4)
(15) CALL F5 (FROM F2)
(16) RETURN TO F2 (FROM F5)
(17) RETURN TO F1 (FROM F2)

FIG.21

(h) RETURN PROCESS

```
START
  ↓
EXECUTION HISTORY COUNT      ~ST211
FOR P←H
  ↓
H←H+1                        ~ST212
  ↓
JUMP TO POINT OF RETURN      ~ST213
  ↓
END
```

FIG.22

```
F1 ( )                F2 ( )
{                     {
    F2 ( );               F3 ( );
}                         F4 ( );
                          i = 2 ;
                          while ( i > 0) {
                              F5 ( );
                              F6 ( );
                              i = i -1 ;
                          }
                      }
```

FIG.23

STATUS CHANGE IN FAST MEMORY

| (1) | (2) | (3) | (4) | (5) | (6) | (7) | (8) | (9) |
|---|---|---|---|---|---|---|---|---|
| F1 (0) | F1 (0) | F1 (0) | F1 (0) | F1 (0) | F1 (0) | F1 (0) | F1 (0) | F1 (0) |
|  | F2 (0) | F2 (0) | F2 (0) | F2 (0) | F2 (0) | F2 (0) | F2 (0) | F2 (0) |
|  |  | F3 (0) | F3 (0) | F3 (0) | F3 (0) | F5 (0) | F5 (2) | F5 (2) |
|  |  |  |  | F4 (0) | F4 (1) | F4 (1) | F4 (1) | F6 (0) |

H: 0, 0, 0, 1, 1, 2, 2, 3, 3

| (10) | (11) | (12) | (13) | (14) | (15) |
|---|---|---|---|---|---|
| F1 (0) | F1 (0) | F1 (0) | F1 (0) | F1 (0) | F1 (0) |
| F2 (0) | F2 (0) | F2 (0) | F2 (0) | F2 (0) | F2 (6) |
| F5 (2) | F5 (2) | F5 (4) | F5 (4) | F5 (4) | F5 (4) |
| F6 (3) | F6 (3) | F6 (3) | F6 (3) | F6 (5) | F6 (5) |

H: 4, 4, 5, 5, 6, 7

( ) NUMBER IN PARENTHESES INDICATES EXECUTION HISTORY COUNT (1) CALL F1
(2) CALL F2 (FROM F1)
(3) CALL F3 (FROM F2)
(4) RETURN TO F2 (FROM F3)
(5) CALL F4 (FROM F2)
(6) RETURN TO F2 (FROM F4)
(7) CALL F5 (FROM F2)
(8) RETURN TO F2 (FROM F5)
(9) CALL F6 (FROM F2)
(10) RETURN TO F2 (FROM F6)
(11) CALL F5 (FROM F2)
(12) RETURN TO F2 (FROM F5)
(13) CALL F6 (FROM F2)
(14) RETURN TO F2 (FROM F6)
(15) RETURN TO F1 (FROM F2)

STATUS CHANGE IN FAST MEMORY WITHOUT LRU (d) MEMORY ALLOCATION PROCESS

STATUS CHANGE IN FAST MEMORY

FIG.28
STATUS CHANGE IN FAST MEMORY WITHOUT COMPACTION
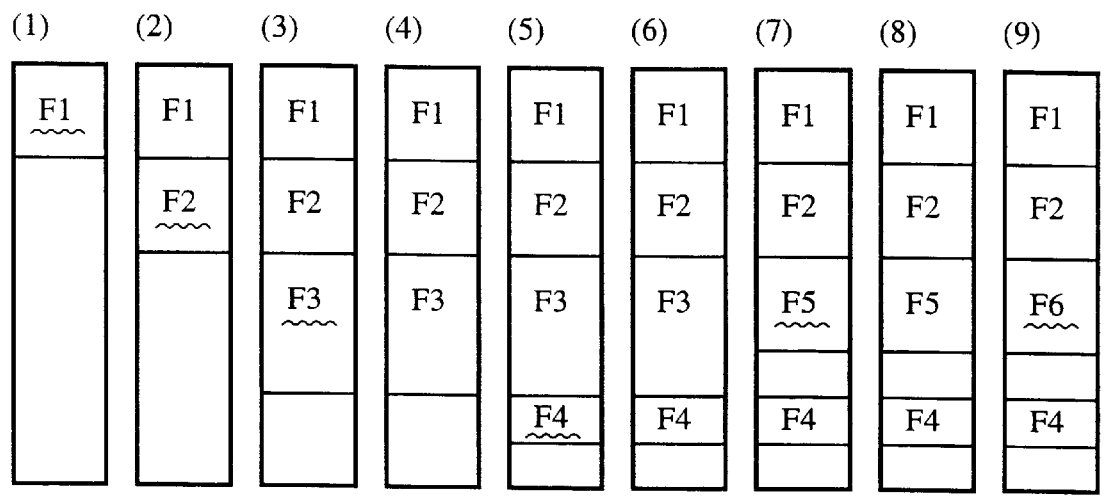
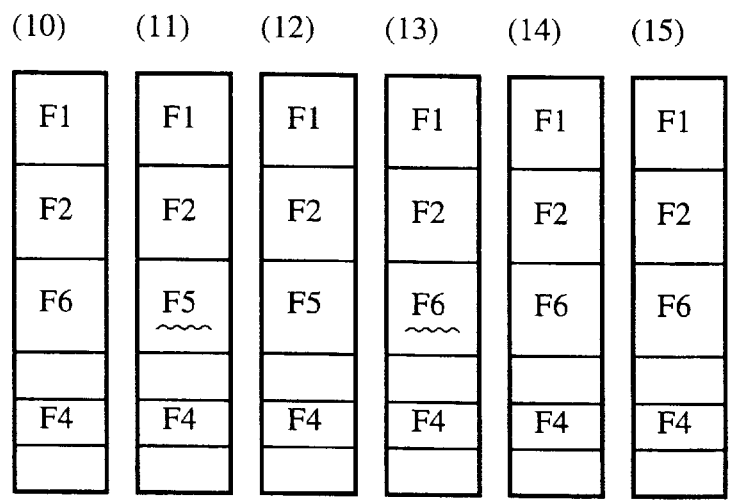

FIG.30A
LOCK FLAG FOR FUNCTION
| FUNCTION NAME | FLAG |
|---|---|
| $F_1$ | 1 |
| $F_2$ | 0 |
| $F_3$ | 1 |
| ⋮ | ⋮ |
| $F_n$ | 0 |
FIG.30B
(g) DETERMINATION AS TO WHETHER LOCK IS BEING VALID
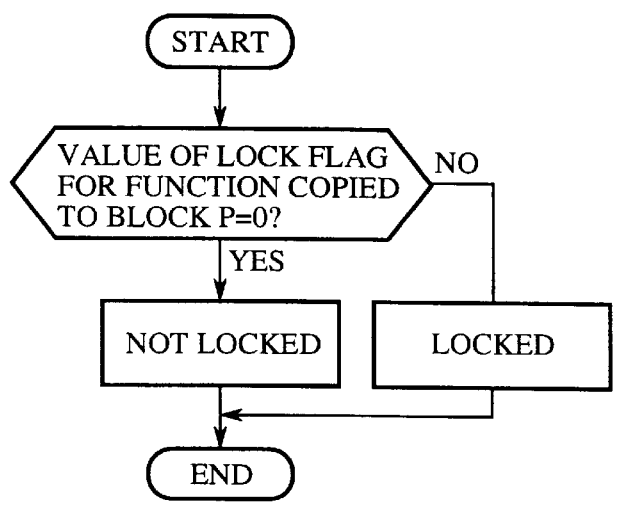
FIG.30C
(q) LOCK PROCESS
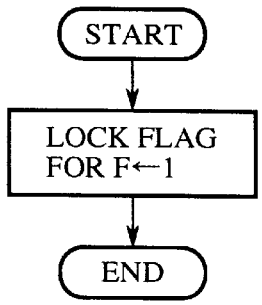
FIG.30D
(r) LOCK RELEASE PROCESS
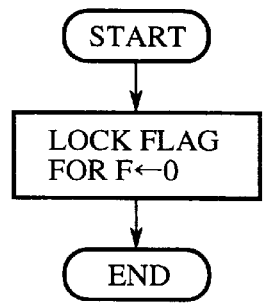
FIG.31
(a) SAMPLE PROGRAM
```
F1 ( )
{
    F2 ( );
    F3 ( );
    F4 ( );
    F2 ( );
}
```

FIG.32A
SETTING OF LOCK FLAG
| FUNCTION | LOCK FLAG |
|----------|-----------|
| F1 | 0 |
| F2 | 1 |
| F3 | 0 |
| F4 | 0 |
(1) CALL F1
(2) CALL F2 (FROM F1)
(3) RETURN TO F1 (FROM F2)
(4) CALL F3 (FROM F1)
(5) RETURN TO F1 (FROM F3)
(6) CALL F4 (FROM F1)
(7) RETURN TO F1 (FROM F4)
(8) CALL F2 (FROM F1)
(9) RETURN TO F1 (FROM F2)
FIG.32B
STATUS CHANGE IN FAST MEMORY
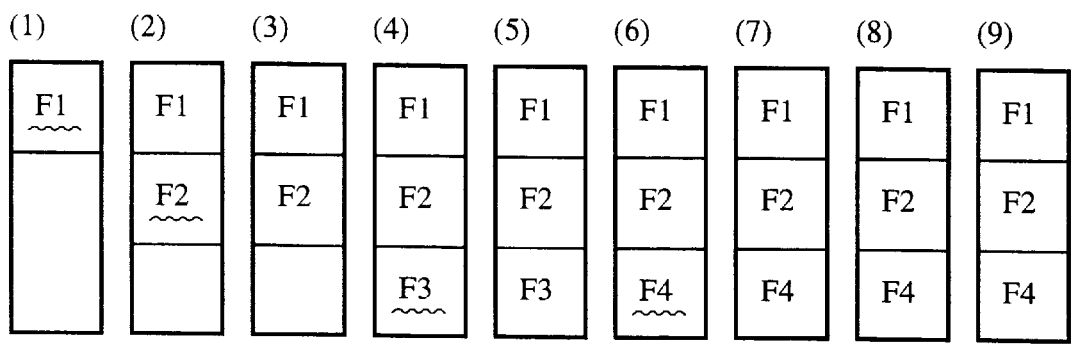
FIG.32C
STATUS CHANGE IN FAST MEMORY WITHOUT LOCK FLAG
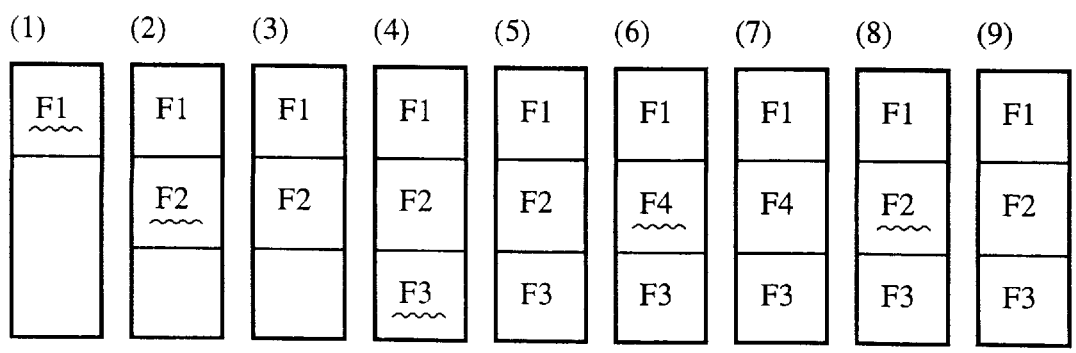

(b) FUNCTION CALL PROCESS

DUPLICATION DETERMINATION TABLE
(TABLE OF DUPLICATION FLAG FOR FUNCTIONS)

| FUNCTION NAME | FLAG |
|---|---|
| $F_1$ | 1 |
| $F_2$ | 0 |
| $F_3$ | 1 |
| ⋮ | ⋮ |
| $F_n$ | 0 |

(s) DUPLICATION DETERMINATION PROCESS

STATUS CHANGE IN FAST MEMORY

SETTING OF DUPLICATION FLAG

| FUNCTION | DUPLICATION FLAG |
|---|---|
| F1 | 0 |
| F2 | 0 |
| F3 | 1 |
| F4 | 1 |
| F5 | 1 |
| F6 | 1 |

FIG.36A

DUPLICATION DETERMINATION TABLE

| FUNCTION | FREQUENCY OF CALLS | FREQUENCY CALLS REQUIRED TO TRIGGER DUPLICATION |
|---|---|---|
| $F_1$ | 0 | $C_1$ |
| ⋮ | ⋮ | ⋮ |
| $F_n$ | 0 | $C_n$ |

FIG.36B (s) DUPLICATION DETERMINATION PROCESS

START
↓
FREQUENCY OF CALLS FOR F ← FREQUENCY OF CALLS FOR F+1  ∼ST361
↓
ST362 — FREQUENCY OF CALLS FOR F > FREQUENCY OF CALLS REQUIRED TO TRIGGER DUPLICATION?
 — NO → ST363 NOT TO BE COPIED
 — YES → ST364 TO BE COPIED
↓
END

```
F2 ( )
{
    F3 ( );
    F4 ( );
    i =10;
    while ( i > 0) }
        F5 ( );
        F6 ( );
        i = i -1;
    }
}
```

STATUS CHANGE IN FAST MEMORY

| FUNCTION | FREQUENCY OF CALLS REQUIRED TO TRIGGER DUPLICATION |
|---|---|
| F1 | 1 |
| F2 | 1 |
| F3 | 1 |
| F4 | 1 |
| F5 | 1 |
| F6 | 1 |

(1) CALL F1
(2) CALL F2
(3) CALL F3
(4) RETURN TO F2
(5) CALL F4
(6) RETURN TO F2
(7) CALL F5
(8) RETURN TO F2
(9) CALL F6
(10) RETURN TO F2
(11) CALL F5
(12) RETURN TO F2
(13) CALL F6
(14) RETURN TO F2
(15) CALL F5
(16) RETURN TO F2
(17) CALL F6
(18) RETURN TO F2
(19) ...REPETITION OF(15)-(18)

STATUS CHANGE IN FAST MEMORY WITHOUT DUPLICATION DETERMINATION BASED ON FREQUENCY OF CALLS

PROGRAM EXECUTION SYSTEM WITH EFFICIENT CODE DUPLICATION

BACKGROUND OF THE INVENTION

1. Field of the Invention

The present invention generally relates to program execution systems for executing a program stored in a memory and, more particularly, to a program execution system for efficiently duplicating a program function code in a fast memory so that the code is executed by a CPU.

2. Description of the Related Art

In general, the speed at which a program is executed by a program execution system such as a computer system is largely affected by the data transfer rate between a processing unit (CPU) and a memory for storing the program (program memory). For instance, when the data transfer rate is low, a high arithmetic capability of the CPU cannot be fully exploited. In general, a fast memory with a high data transfer rate may be more expensive than a normal memory and the memory capacity installable in the system may be small.

Thus, in the related art, the program execution rate is increased by building in a fast memory in a computer system to improve the data transfer rate between the CPU and the program memory. The fast memory is used in combination with the normal memory for storing the program so that the performance of the fast memory is taken advantage of.

The related art technology with the above-described feature is demonstrated in a system as shown in FIG. 40 which includes a cache memory as a fast memory. FIG. 40 is a block diagram showing the related-art computer system. Referring to FIG. 40, numeral 1001 indicates a CPU, 1002 indicates a cache memory and 1003 indicates a normal memory. The term "normal memory" refers to a memory with an operating speed slower than that of the cache memory 1002 and a memory size larger than that of the cache memory 1002.

In the related-art computer system shown in FIG. 40, the cache memory 1002 implementing the fast memory is placed between the normal memory 1003 which stores the program and the CPU 1001. The cache memory 1002 is used as a location to temporarily store duplicated program codes stored in the normal memory 1003.

Whenever the normal memory 1003 is accessed by the CPU 1001 to execute the program stored in the normal memory 1003, a check is made to determine whether a duplicate of the program code to be accessed is located in the cache memory 1002, that is, whether the code is duplicated in the cache memory 1002.

When the duplicate of the program code to be accessed is located in the cache memory 1002, the duplicate is used. When the program code cannot be located, the program code to be accessed is read from the normal memory 1003, whereupon it is duplicated in the cache memory 1002 and then executed.

When not all of the program codes accessed by the CPU 1001 can be stored in the cache memory 1002, the CPU 1001 removes program codes from the cache memory 1002 and stores duplicates of new program codes in the cache memory 1002.

One aspect of the related-art concerning the cache memory 1002 is that it is necessary to effect a high-speed determination as to whether the duplicate of the program code to be accessed is located in the cache memory 1002. Since this determination is made every time the CPU 1001 accesses the normal memory 1003, that is, for each instruction which the CPU 1001 executes, this determination should be made at a sufficiently high speed to make the duration of determination negligible relative to the instruction execution rate of the CPU 1001. A distinctive feature of the cache memory 1002 implementing the fast memory lies in its high access speed. Therefore, if the speed of determination is slow, the benefit of the cache memory 1002 is not available even if the program codes are read from the cache memory 1002 at a high speed.

In the related-art program execution system with the above-described construction, not only a determination operation but also all of the operations related to the cache memory 1002 are controlled using hardware. For this reason, the related-art computer system with the cache memory 1002 built in may be complicated. That is, the hardware circuitry and the control of the cache memory 1002 tend to be complicated.

Another thing of note is that, while the cache memory 1002 implementing the fast memory provides a benefit of high-speed operation, it poses problems such as expensiveness and limitation in the memory capacity. Thus, duplicating all program codes from the normal memory 1003 to the cache memory 1002 is impossible. For this reason, the controllers for the CPU 1001 and the cache memory 1002 control duplication in the cache memory 1002 by exercising appropriate determination in accordance with the flow of process.

SUMMARY OF THE INVENTION

Accordingly, an object of the present invention is to provide a program execution system in which the aforementioned disadvantages are eliminated.

Another and more specific object is to provide a program execution system capable of high-speed execution of function codes, even those for a program that exceeds a memory capacity of the fast memory, without increasing the complexity of hardware for controlling the fast memory (such as a cache memory), by efficiently duplicating function codes in a fast memory.

The aforementioned objects can be achieved by a program execution system comprising: first storage means provided with permanent addresses located in a memory space and characterized by a relatively fast access; second storage means for storing a program, provided with permanent addresses located in the memory space and characterized by a comparatively slower access; control means for decoding the program and outputting a decoded result to an instruction execution means; wherein the control means further comprises: hit determination means for determining, when a function code in the program is called, whether a duplicate of the function code, originally residing in the second storage means, is located in the first storage means; memory allocation means for allocating a free block for storing the duplicate of the function code; memory release means for releasing a block created in the first storage means so as to create the free block; code duplicating means for creating a duplicate of the function code in the free block created by the memory release means in the first storage means; release determination means for determining whether the duplicate of the function code created in the first storage means can be removed from the first storage means; and release resolution means for determining which of the function codes determined to be ready for removal should be removed from the first storage means; and wherein the control means effects control such that, when the function code is called, the duplicate of the function code is read from the first storage means and executed; in the absence of the duplicate of the function code, the duplicate of the function code is created in the first storage means so that the instruction execution means executes the function code; and the free block capable of storing the duplicate of the called function code is made available after the function code ready for removal is removed from the first storage means.

The control means may further comprise execution order storage means for storing the order of execution of duplicates of function codes created in the first storage means; and wherein the release resolution means creates the free block by preferentially releasing a block containing the oldest function code executed by referring to the execution order storage means.

The control means may further comprise relocating means for moving and relocating the duplicate of the function code created the first storage means; and wherein, by releasing some of the blocks containing function codes determined to be ready for removal are released, and by moving or relocating other blocks, unused areas distributed in the first storage means are joined together so as to create a new free block.

The control means may further comprise lock flag setting means for setting a lock flag to each of the function codes; and wherein the release determination means refers to the lock flag so that the duplicate of the function code having the lock flag thereof set to a predetermined value is prevented from being removed from the first storage means.

The control means may further comprise duplicate flag setting and releasing means for setting a duplicate flag, provided for each of the function codes, to a predetermined value and for releasing the predetermined value; and wherein, when a function code is called, the value of the duplicate flag is referred to so that, only when the duplicate flag is set to the predetermined value, the duplicate of the function code is created in the first storage means so that the function code is executed.

The control means may further comprise counting means for counting a frequency of calls of the function code; and wherein, when the frequency of calls of the function code is lower than a predetermined count, the function code read from the second storage means is executed, and, when the frequency of calls exceeds the predetermined count, the duplicate of the function code is created in the first storage means so that the function code is executed.

BRIEF DESCRIPTION OF THE DRAWINGS

Other objects and further features of the present invention will be apparent from the following detailed description when read in conjunction with the accompanying drawings, in which:

FIG. 11 shows a sample program executed by the program execution system according to the first embodiment;

FIG. 12 shows a status of function codes duplicated in the fast memory;

FIG. 16A is a flowchart showing an execution mark release process;

FIG. 16B is a flowchart showing an execution determination process;

FIG. 17 shows a sample program executed by the program execution system according to the second embodiment;

FIG. 18 shows a status of function codes duplicated in the fast memory when the program shown in FIG. 17 is executed by the program execution system according to the second embodiment;

FIG. 21 is a flowchart showing a return process performed by the program execution system according to the third embodiment;

FIG. 22 shows a sample program executed by the program execution system according to the third embodiment;

FIG. 23 shows a status of function codes duplicated in the fast memory when the program shown in FIG. 22 executed by the program execution system according to the third embodiment;

FIG. 28 shows a status of function codes duplicated in the fast memory when the program shown in FIG. 22 is executed by the program execution system according to the first embodiment or the program execution system according to the second embodiment;

FIG. 30A is a table listing lock flags for respective functions;

FIG. 30B is a flowchart showing a lock determination process performed by the program execution system according to the fifth embodiment;

FIG. 30C is a flowchart showing a lock process performed by the program execution system according to the fifth embodiment;

FIG. 30D is a flowchart showing a lock release process performed by the program execution system according to the fifth embodiment;

FIG. 31 shows a sample program executed by the program execution system according to the fifth embodiment;

FIG. 32A shows a table listing lock flags for respective functions;

FIG. 32B shows a status of function codes duplicated in the fast memory when the program shown in FIG. 31 is executed by the program execution system according to the fifth embodiment;

FIG. 32C shows a status of function codes duplicated in the fast memory when the program shown in FIG. 31 is executed by the program execution system according to the first embodiment or the program execution system according to the second embodiment;

FIG. 36A is a table listing frequency of calls and predetermined frequency of calls required to trigger duplication, for respective functions;

FIG. 36B is a flowchart showing a duplication determination process executed by the program execution system according to the seventh embodiment of the present invention;

FIG. 37 shows a sample program executed by the program execution system according to the seventh embodiment;

DETAILED DESCRIPTION OF THE PREFERRED EMBODIMENTS

Embodiment 1

Figure 1:
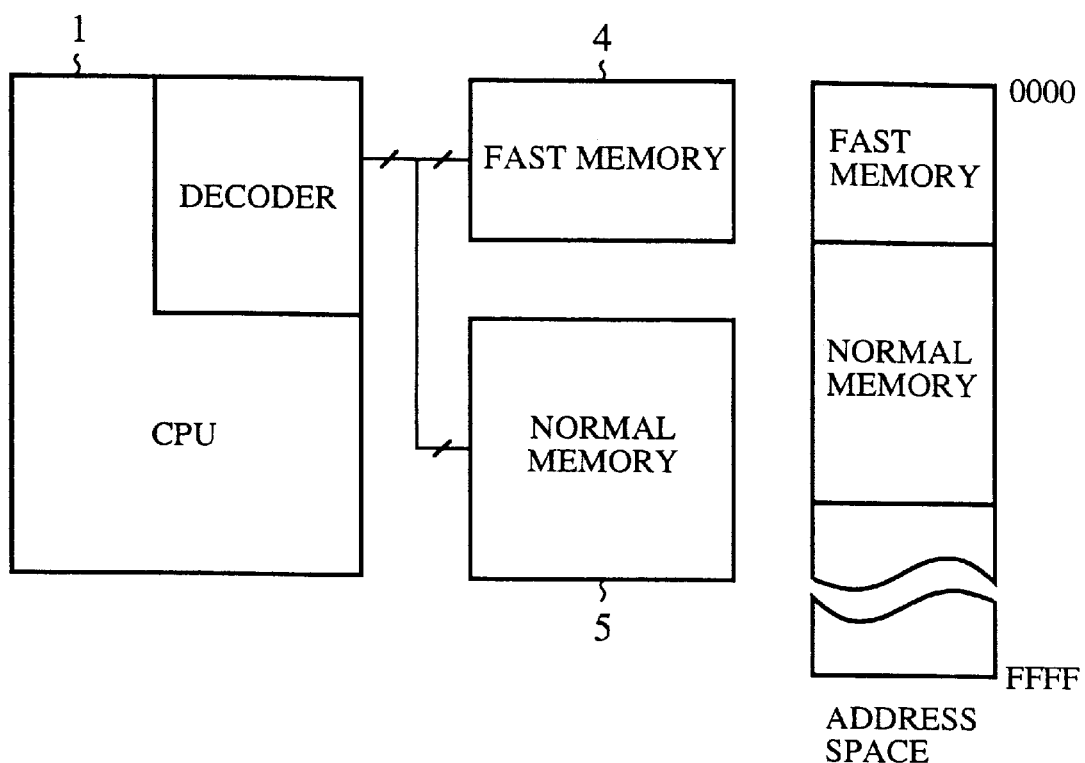
FIG. 1 is a block diagram showing a program execution system according to a first embodiment of the present invention.

FIG. 1 is a block diagram showing a program execution system according to a first embodiment of the present invention. Referring to FIG. 1, numeral 1 indicating a CPU and a decoder attached thereto inclusively. Numeral 4 indicates a fast memory used, for example, as a cache memory, and 5 indicates a normal memory. As shown on the right-hand side of FIG. 1, in the illustrated program execution system, the fast memory 4 and the normal memory 5 are arranged so as to be continuous with each other in an address space. Therefore, the fast memory 4 and the normal memory 5 are directly addressable by the CPU 1.

In the program execution systems according to the first through seventh embodiments of the present invention described hereinafter, the CPU 1 reads a program stored in the normal memory 5 implemented by a RAM or a ROM, duplicates function codes in the fast memory 4 efficiently in accordance with a predetermined procedure, decodes instructions thus read using the decoder, outputs the decoded instructions to a plurality of instruction executing means (not shown) implemented, for example, by integer operation units (not shown) and memory access units (not shown) so that the instructions are executed.

Figure 2:
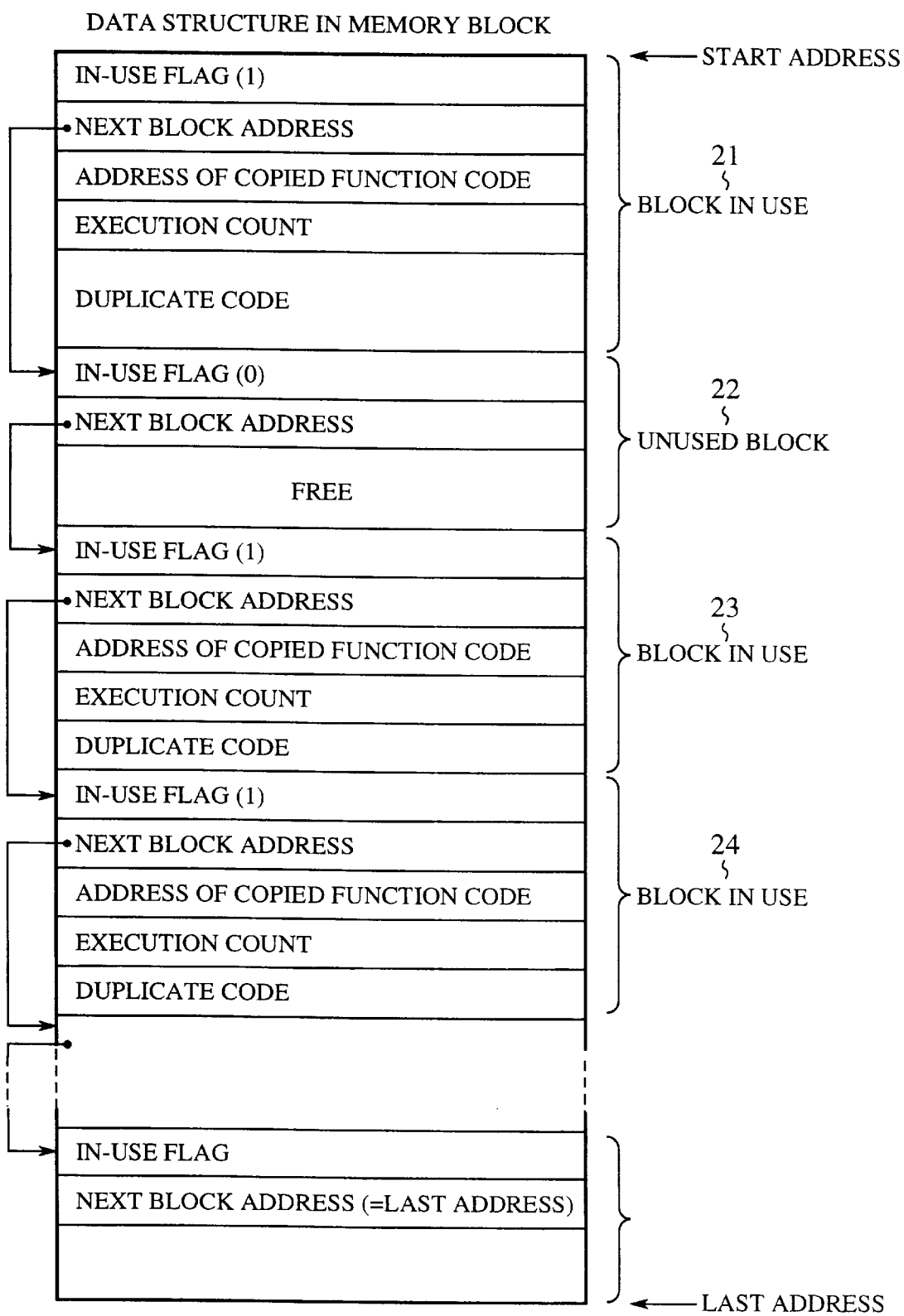
FIG. 2 shows a data structure built in a fast memory.

FIG. 2 shows the structure of data built in the fast memory 4. Referring to FIG. 2, numeral 21 indicates a data block in the fast memory 4 in which a function code is duplicated. An in-use flag set to "1" at the head of the data block 21 indicates that the data block is in use. The data block 21 also contains a pointer area in which a next block address (address of a subsequent block) is indicated In the illustrated example, the next block address in the data block 21 points to an unused block.

Next to the pointer area is provided an area for storing an address in the normal memory 5 storing an original function code of which a duplicate is created in the data block 21. This area stores an address in the normal memory 5 that stores the function code which is a source of duplication. An execution count area is provided next, followed by an area for storing the duplicate function code. A plurality of data blocks like the data block 21 described above are provided in the fast memory 4.

In the program execution system according to the first embodiment, it is assumed that the function codes have the identical size and the block sizes for respective function codes duplicated in the fast memory 4 are identical.

A description will now be given of the operation according to the first embodiment.

Figure 3A:
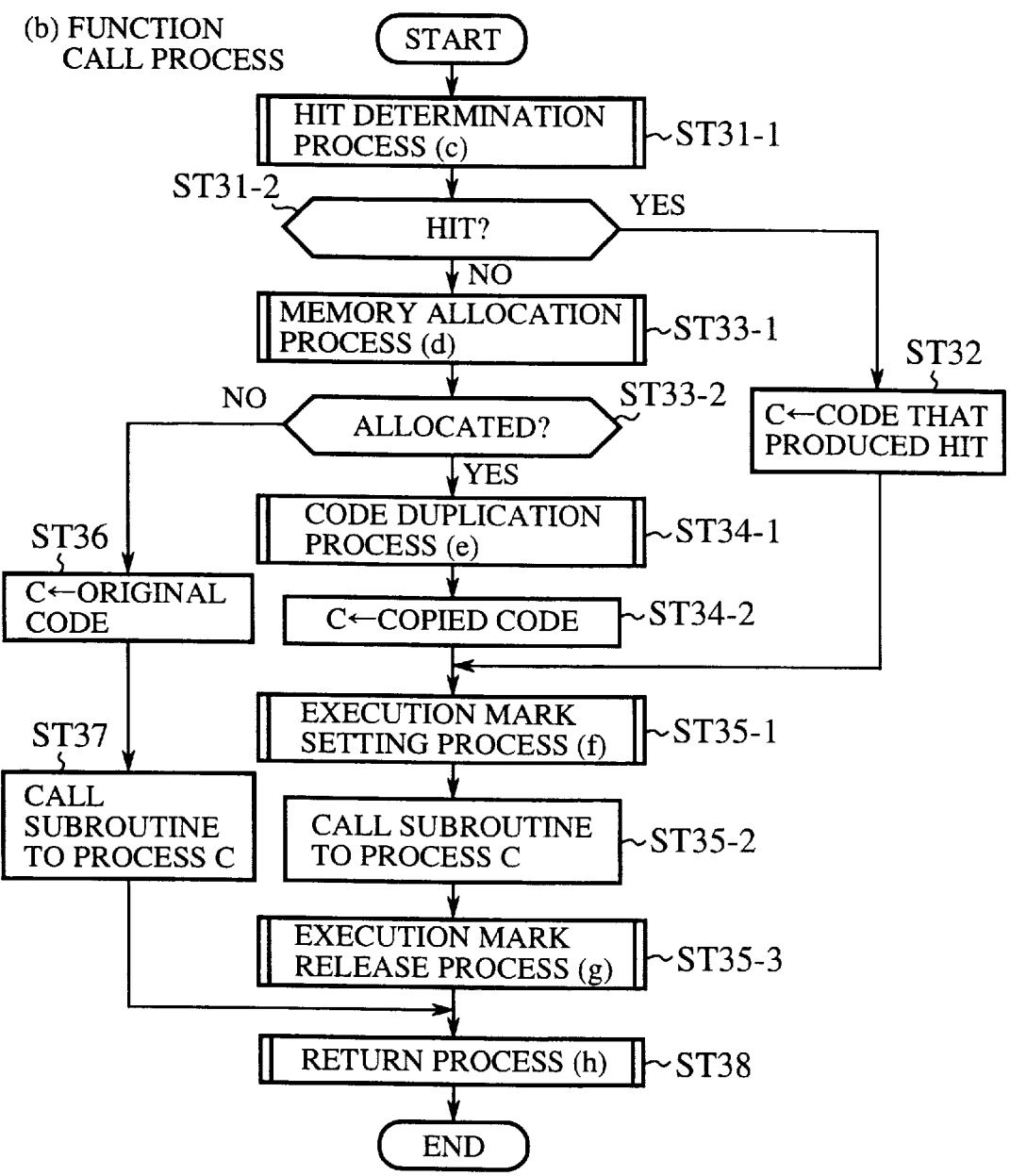
FIG. 3A is a flowchart showing a function call process performed by the program execution system according to the first embodiment.
Figure 3B:
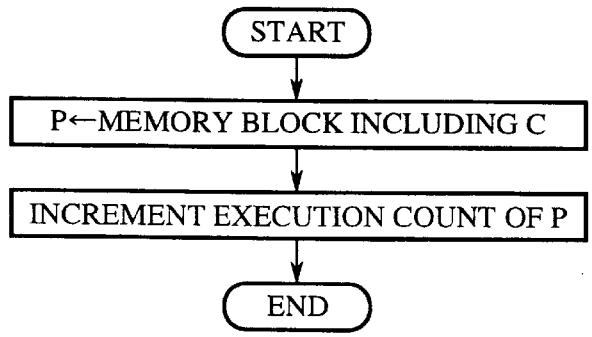
FIG. 3B is a flowchart showing an execution an execution mark setting process performed by the program execution system according to the first embodiment.
Figure 3C:
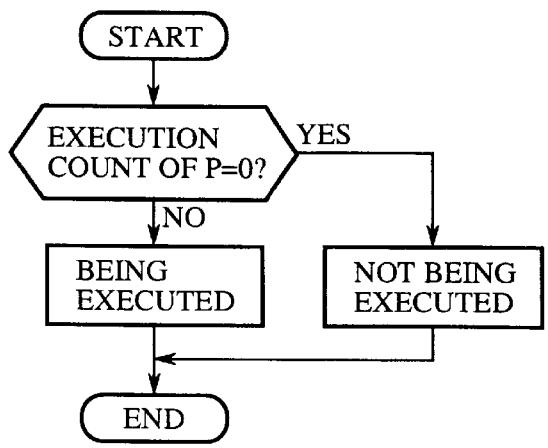
FIG. 3C is a flowchart showing an execution determination process performed by the program execution system according to the first embodiment.
Figure 3D:
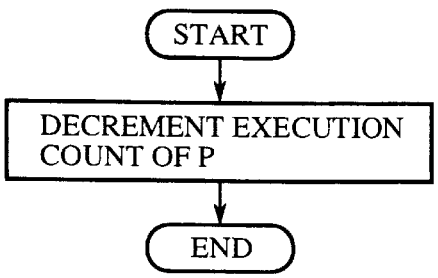
FIG. 3D is a flowchart showing an execution mark release process performed by the program execution system according to the first embodiment.
Figure 4:
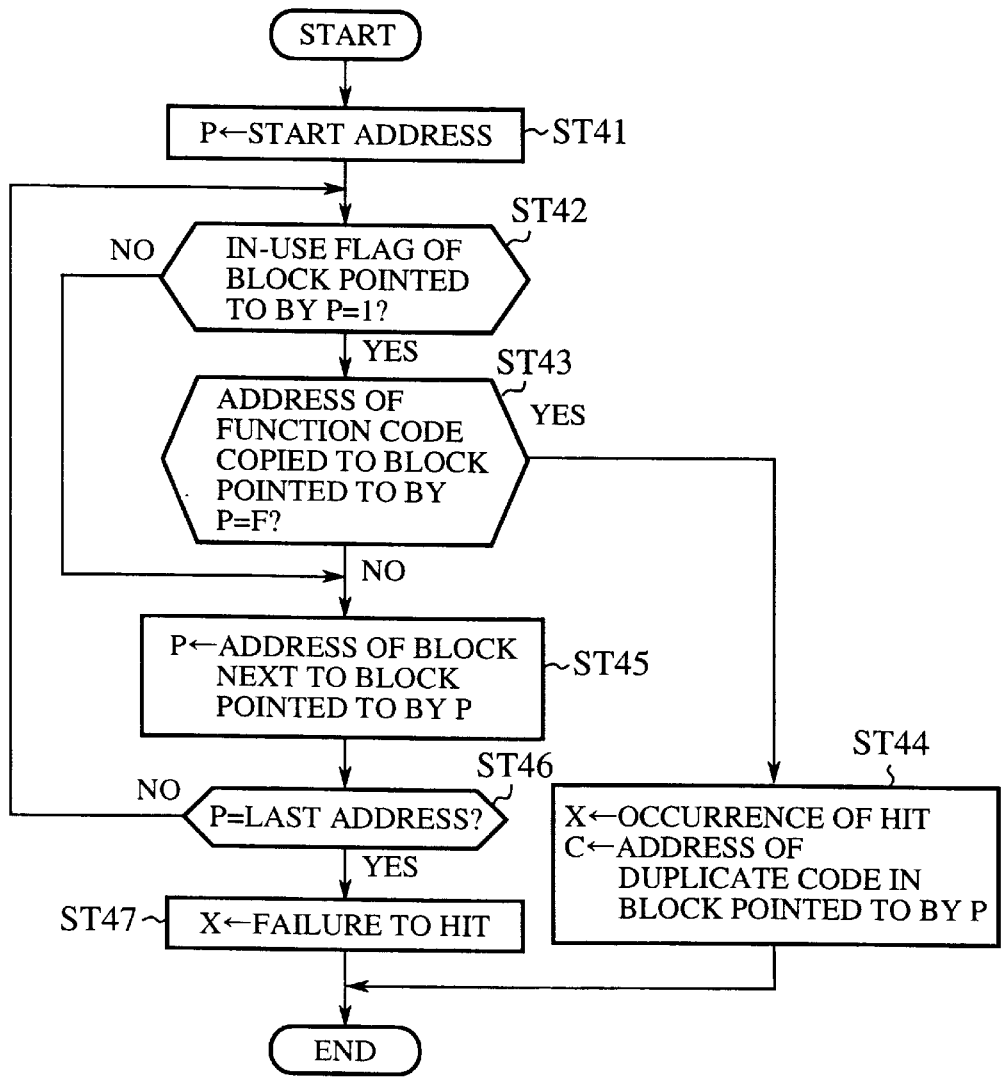
FIG. 4 is a flowchart showing a hit determination process performed by the program execution system according to the first embodiment.
Figure 5:
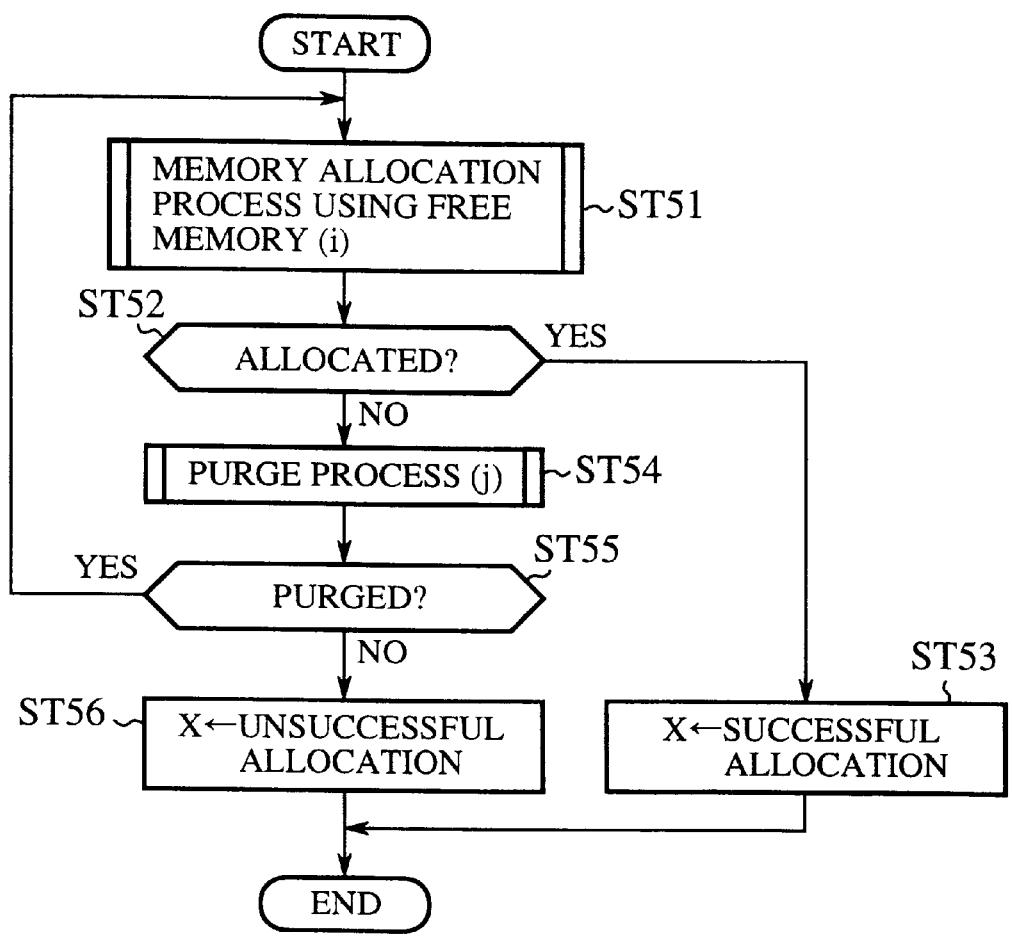
FIG. 5 is a flowchart showing a memory allocation process performed by the program execution system according to the first embodiment.
Figure 6:
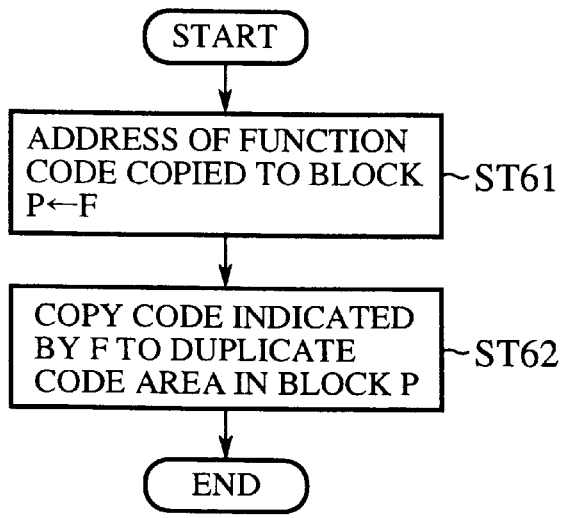
FIG. 6 is a flowchart showing a code duplication process performed by the program execution system according to the first embodiment.

FIG. 3A is a flowchart showing a function call process performed by the program execution system according to the first embodiment; FIG. 3B is a flowchart showing an execution mark setting process performed by the program execution system according to the first embodiment; FIG. 3C is a flowchart showing an execution determination process performed by the program execution system according to the first embodiment; and FIG. 3D is a flowchart showing an execution mark release process performed by the program execution system according to the first embodiment. FIG. 4 is a flowchart showing a hit determination process performed by the program execution system according to the first embodiment. FIG. 5 is a flowchart showing a memory allocation process performed by the program execution system according to the first embodiment. FIG. 6 is a flowchart showing a code duplication process performed by the program execution system according to the first embodiment.

Figure 7:
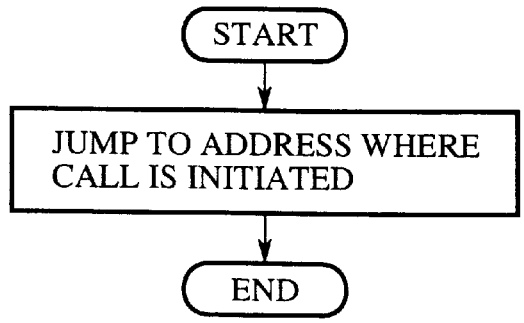
FIG. 7 is a flowchart showing a return process performed by the program execution system according to the first embodiment.
Figure 8:
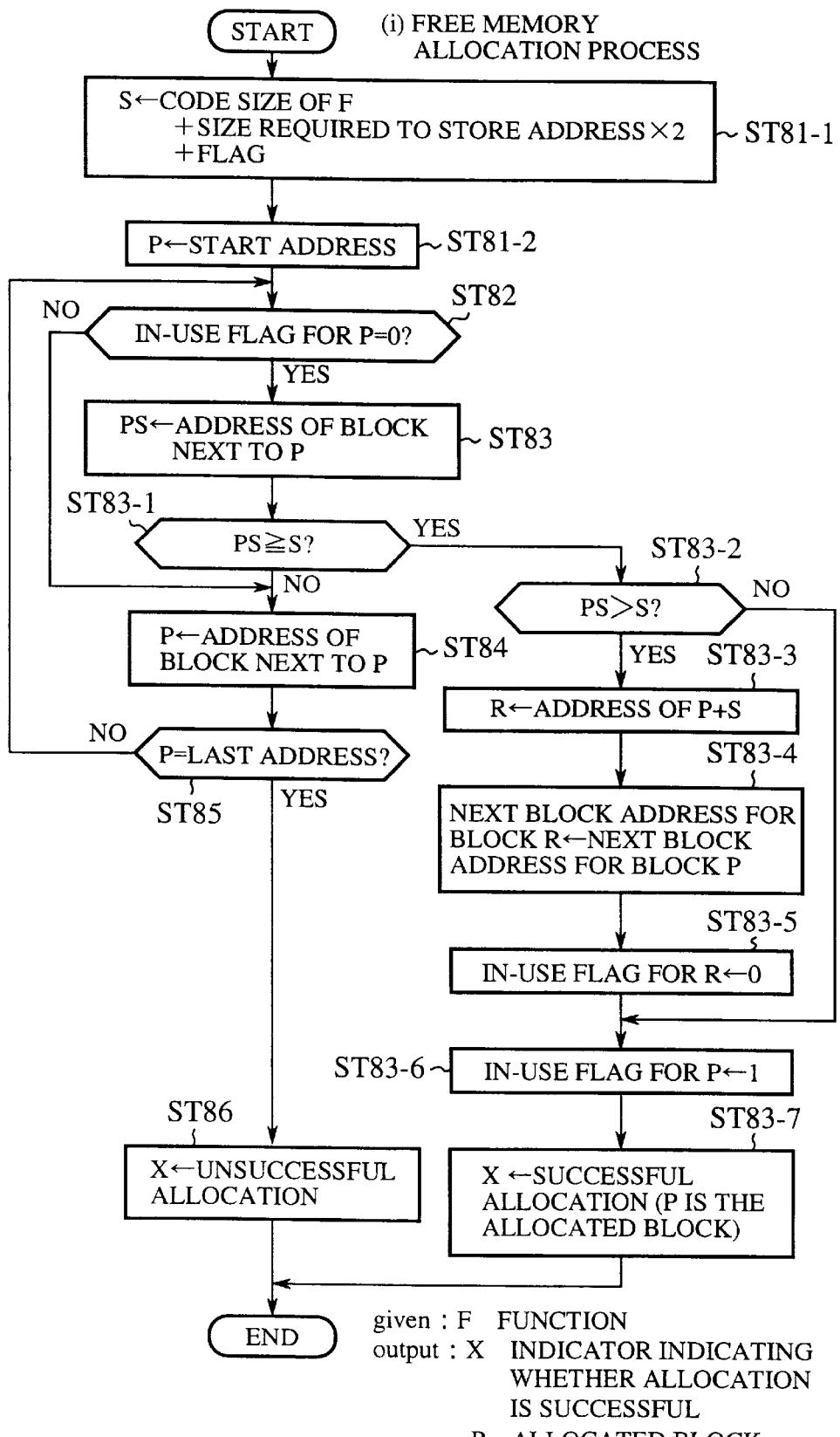
FIG. 8 is a flowchart showing a free memory allocation process performed by the program execution system according to the first embodiment.
Figure 9:
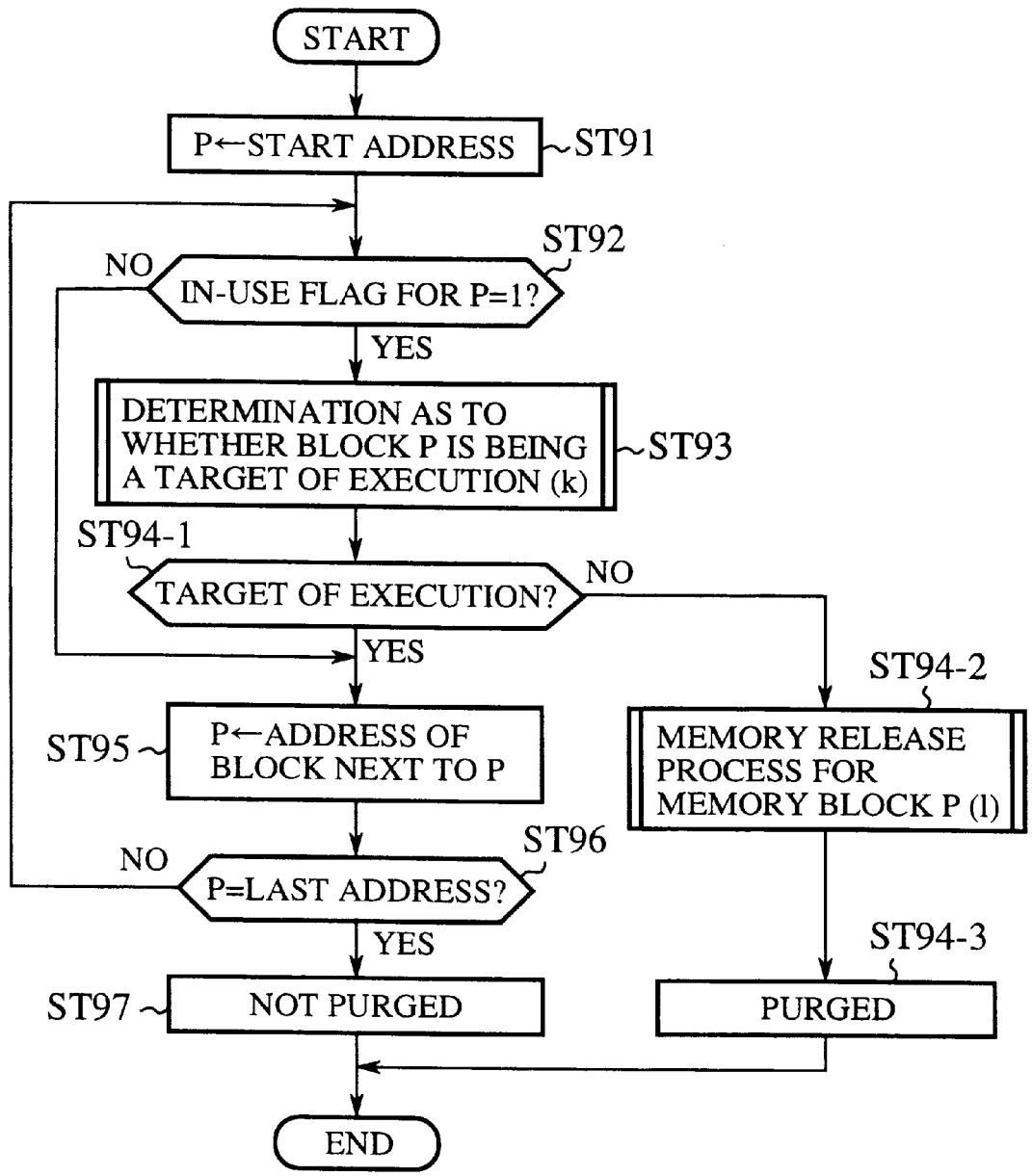
FIG. 9 is a flowchart showing a purge process performed by the program execution system according to the first embodiment.
Figure 10:
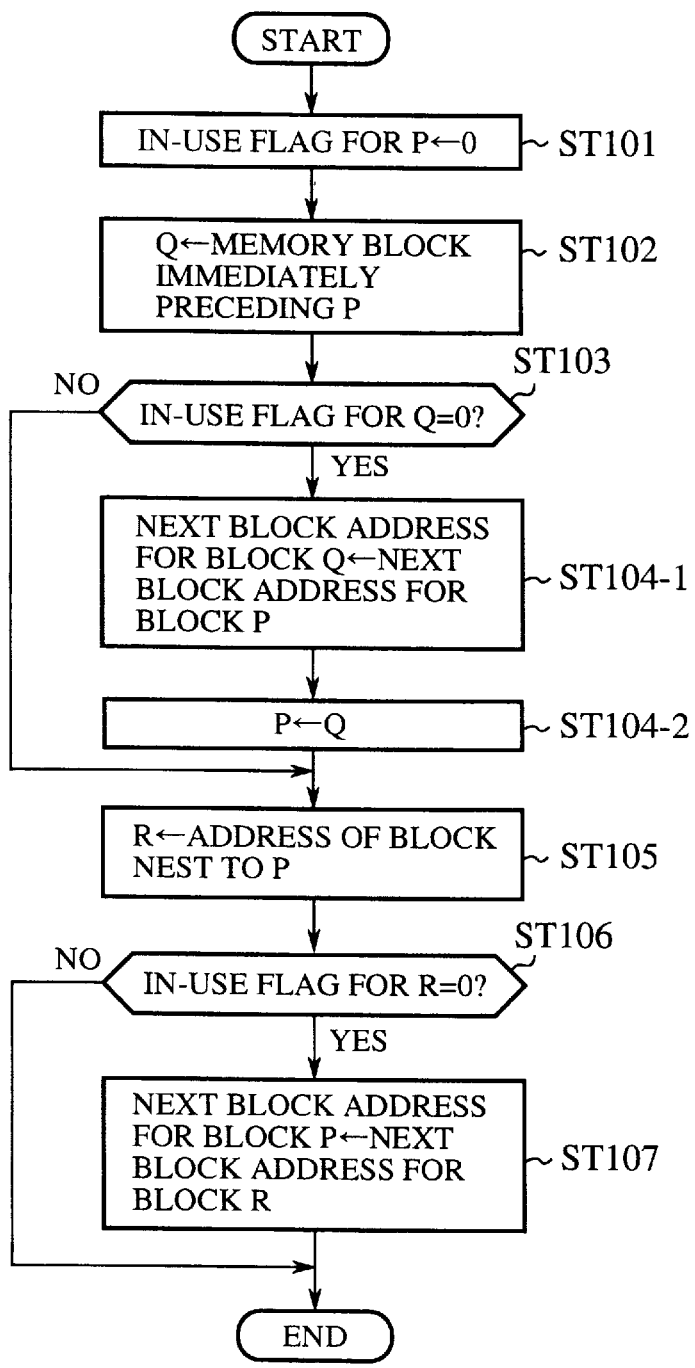
FIG. 10 is a memory release process performed by the program execution system according to the first embodiment.

FIG. 7 is a flowchart showing a return process performed by the program execution system according to the first embodiment. FIG. 8 is a flowchart showing a free memory allocation process performed by the program execution system according to the first embodiment. FIG. 9 is a flowchart showing a purge process performed by the program execution system according to the first embodiment. FIG. 10 is a memory release process performed by the program execution system according to the first embodiment.

FIG. 11 shows a sample program executed by the program execution system according to the first embodiment. FIG. 12 shows a status of function codes duplicated in the fast memory when the program shown in FIG. 11 is executed by the program execution system according to the first embodiment in accordance with the flowcharts of FIGS. 3A through 10.

More specifically, FIG. 12 shows how the duplicates of the function codes are produced in the fast memory 4 when the program shown in FIG. 11 is executed in accordance with the flowcharts of FIGS. 3A through 10. In FIG. 12, the function codes duplicated in the fast memory 4 are schematically shown. Each of the function codes is duplicated so as to fit the data structure shown in FIG. 2. The number in the parentheses attached to each function code shown in FIG. 12 indicates an execution count.

As shown in FIG. 11, the program starts being executed after the function code F1 is duplicated in the fast memory 4. Duplication is executed according to the flowcharts of FIGS. 3A, 3B, 3C and 3D.

First, a hit determination process is performed in step ST31-1 of FIG. 3. The hit determination process is executed according to a subroutine shown in FIG. 4.

Referring to FIG. 4, a start address of the fast memory 4 is substituted into an address variable P in step ST41. In other words, the address pointer P is placed at the head of the fast memory 4. In step ST42, a determination is made as to whether the in-use flag for the block pointed to by the variable P (hereinafter, sometimes simply referred to as the block P) is set to "1". If it is determined that the block P is in use, a determination is then made in step ST43 as to whether the address in the normal memory 5 storing the function code of which a duplicate is created in the block P is the address of the target function code for execution. If an affirmative answer results from step ST43, an indicator value indicating that a hit has occurred is substituted into a variable X, and the address of the duplicated function code is substituted into a variable C in step ST44. If a negative answer is yielded in step ST42 or in step ST43, the next block address is substituted into the variable P in step ST45. That is, the pointer P is placed at the next block. In step ST46 that follows, a determination is made as to whether the pointer P points to the last address. Upon a negative answer, control is returned to step ST42. If the last address has been reached, an indicator value indicating that a hit has not occurred is substituted into the variable X.

Referring back to FIG. 3A, in step ST31-2, the result of hit determination process executed in step ST31-1 is referred to and a determination is made as to whether the target function code F1 for execution is stored in the fast memory 4. If a hit has occurred, control is turned to step ST32 of FIG. 3, where the function code F1 that produced a hit is substituted into the variable C. Step ST35-1 for an execution mark setting process is then executed.

If it is determined in step ST31-2 that no hit has occurred, a memory allocation process is performed in step ST33-1 in accordance with a subroutine shown in FIG. 5.

The memory allocation process is comprised of steps ST51 through ST56. A free area in the fast memory 4 is allocated to the function code F1 to be copied to the fast memory 4. In step ST51, the memory allocation using a free area is performed in accordance with the flow illustrated in FIG. 8.

Referring to FIG. 8, in step ST81-1, a sum of the size of the target code F for execution, the size required to store the address of the code F and the size required for the flag is substituted into a variable S. In step ST81-2, the pointer P is placed at the start address of the fast memory 4. In step ST82, a determination is made as to whether the in-use flag for the block pointed to by P is set to "0", indicating that the block is unused. If it is determined that the block is unused, the address of the block P subtracted from the next block address for the block P is substituted into a variable PS in step ST83. In step ST83-1, a determination is made as to whether a relation PS≧S holds. This is to determine whether the block P has a sufficient size to hold the code F. If a negative answer is yielded, the pointer P is moved to the next block. In step ST85, a determination is made as to whether the last address in the fast memory 4 has been reached. If an affirmative answer is yielded in step ST85, it is determined in step ST86 that the memory allocation is unsuccessful. If it is determined in step ST85 that the last address has not been reached, control is returned to step ST82. If an affirmative answer is yielded in step ST83-1, that is, if it is determined that the block P has a sufficient size to hold the code F, a determination is made in step ST83-2 as to whether the relation PS≧P holds. If an affirmative answer is yielded, a sum of the address of the block P and the value stored in the variable S is substituted into a variable R in step ST83-3. This is to place the pointer R next to the block P. Subsequently, in step ST83-4, the next block address for the block R is set to that of the block P. Step ST83-4 is provided to ensure that the block R continues to the block next to the block P. In step ST83-5, the in-use flag for the block R is set to "0". In step ST83-6, the in-use flag for the block P is set to "1". In step ST83-7, an indicator value indicating a occurrence of successful allocation is substituted into the variable X.

If it is determined, as a result of step ST83-2, that PS=S, control is turned to step ST83-6.

The result of the free memory allocation process of FIG. 8 is checked in step ST52 of FIG. 5. In the subsequent step ST53, an indicator value (for example, "1") indicating that the memory allocation is successful is substituted into the variable X, whereupon control is turned to step ST33-2 of FIG. 3.

Referring back to FIG. 5, if it is determined in step ST52 that the memory allocation is unsuccessful, control is turned to step ST54, where a purge process is performed in accordance with the subroutine shown in FIG. 9. In this subroutine, a data block in use is purged in order to create a free data block in the fast memory 4. Referring to FIG. 9, the start address is substituted into an address variable (pointer) P in step ST91. A determination is made in step ST92 as to whether the in-use flag for the block in the fast memory 4 pointed to by the pointer P is set to "1". If it is determined that the in-use flag for the block indicated by the pointer P is not set to "1", control is turned to step ST95, where the address for the next block is substituted into the pointer P. If it is determined in step ST96 the last address has been reached, a determination is made in step ST97 that the purge process is unsuccessful. If it is determined in step ST96 that the pointer P does not point to the last address in the fast memory 4, control is returned to step ST92. If it is determined in step ST96 that the pointer P does not point to the last address, control is returned to step ST92 so that a sequence including steps ST92, ST93, ST94-1 and ST95 are repeated.

If it is determined in step ST92 that the in-use flag for the block pointed to by the pointer P is set to "1", a determination is made in step ST93 as to whether the code in the block pointed to by P is being executed, in accordance with the subroutine shown in FIG. 3C. Referring to FIG. 3C, a determination is made as to whether the execution count for the block pointed to by P is set to "0". If a negative answer is yielded, a determination is made that the code in the block is being executed. If an affirmative answer is yielded, a determination is made that the code in the block is not being executed. The determination is fed to step ST94-1 of FIG. 9. If it is determined that the code in the block pointed to by P is not being executed, control is turned to step ST94-2, where a memory release process illustrated in FIG. 10 is performed.

FIG. 10 is a flowchart showing the memory release process performed in the fast memory 4. Referring to FIG. 10, the in-use flag for the block in the fast memory 4 pointed to by the pointer P is set to "0" in step ST1O1. The address of the block immediately preceding the block indicated by P is substituted to an address variable Q. A determination is made as to whether the in-use flag for the block pointed to by Q is set to "0" in step ST103. If the in-use flag is set to "0", the next block address for the block Q is replaced by that of the block P in step ST104-1, whereupon the pointer P is moved to the block Q in step ST104-2. Thus, the block P to be released and its preceding unused block Q are merged through steps ST104-1 and ST104-2. Subsequent to step ST104-2 or upon a negative determination in step ST103, step ST105 is executed so as to place the next block address for the block P in the address variable (pointer) R. A determination is then made in step ST106 as to whether the in-use flag for the block pointed to by the pointer R is set to "0". Upon an affirmative answer in step ST106, the next block address for the block P is replaced by the next block address for the block R in step ST107. Thus, the block P and its subsequent unused block R are merged through steps ST106 and ST107. As described, in the memory release process of FIG. 10, not only the target block P is released but also the block P and unused blocks adjacent to the block indicated by the pointer P are merged on the condition that the in-use flag for those blocks is set to "0", thus creating a larger free area than otherwise. When the memory release process is completed, control is returned to step ST94-3 in the purge process of FIG. 9, where a determination is given that the purge process is successful. The result of the purge process is checked in step ST55 of FIG. 5. If the purge process is successful, it means that free blocks are made available in the fast memory 4. Control is then returned to step ST51, where the memory allocation process is repeated.

If the purge process is unsuccessful, it means that no free area is made available in the fast memory 4. Control is then turned to step ST56, where a determination that the memory allocation is unsuccessful is given. The determination in step ST56 or the determination in step ST53 is fed to step ST33-2 of FIG. 3. An unsuccessful memory allocation leads to step ST36 where the function code F1 is substituted into a variable C. In step ST37 that follows, a subroutine for executing the function code indicated by C is called. Thereafter, control is turned to step ST38 where a return process is performed in accordance with the subroutine shown in FIG. 7 for jumping to the address where the call is initiated.

Upon a determination in step ST33-2 that the memory allocation is successful, control is turned to step ST34-1. In step ST34-1, a code duplication process is performed in accordance with the subroutine shown in FIG. 6, so as to create a duplicate of the function code F1 in a designated block in the fast memory 4 in compliance with the data structure shown in FIG. 2. Referring to FIG. 6, it is ensured in step ST61 that the address of the function code F to be copied to the block indicated by P is set in the block P. In step ST62, the function code F is copied to the duplicate code area in the block P.

In step ST34-2 that follows the code duplication process in step ST34-1, the address in the normal memory 3 storing the copied function code F1 is substituted into the variable C, whereupon control is turned to step ST35-1. In step ST35-1, an execution mark setting process is performed in accordance with the subroutine shown in FIG. 3B. Referring to FIG. 3B, in the execution mark setting process, the address of the block containing the code indicated by C is substituted into the variable P, whereupon the execution count for the block indicated by the variable P is incremented by one.

In step ST35-2 following the execution mark setting process, the subroutine to process the code indicated by C is called. Step ST35-2 is identical to the step ST37. When step ST35-2 has been executed, an execution mark release process is performed in step ST35-3 in accordance with the subroutine shown in FIG. 3D, where the execution count for the target block is decremented by one.

Control is then turned to step ST38, where the return process shown in FIG. 7 is performed.

FIG. 12 shows a status change in the fast memory 4 when the program execution system according to the first embodiment executes the sample program shown in FIG. 11 in accordance with the flowchart of FIGS. 3A through 10. For example, (3) and (4) of FIG. 12 show that the copy of the function code F2 in the fast memory 4 is used.

(7) of FIG. 12 shows that the function code F3 has given its place to the code F4 as a result of the memory release process according to FIG. 10 for releasing the block in the fast memory 4 that contained the function code F3 as shown in (6) of FIG. 12.

Thus, according to the first embodiment, a duplicate of each of the function codes in a program executed by the program execution system is created in an unused block available in the fast memory 4. Whenever a function code is executed, a check is made to determine whether the duplicate of the function code is located in the fast memory 4. If the duplicate is located, it is read and executed. The time required to determine the presence of the duplicate of a function is negligible relative to the instruction execution rate of the CPU. Software implementation according to the first embodiment eliminated the need to increase the complexity of hardware, thus saving the cost required for hardware. When the size of the fast memory 4 is smaller than that of the program executed, blocks already containing function codes are released so that additional duplicates of function codes are created. It is thus ensured that none of the target function codes suffers a delay in execution.

Embodiment 2

Figure 13:
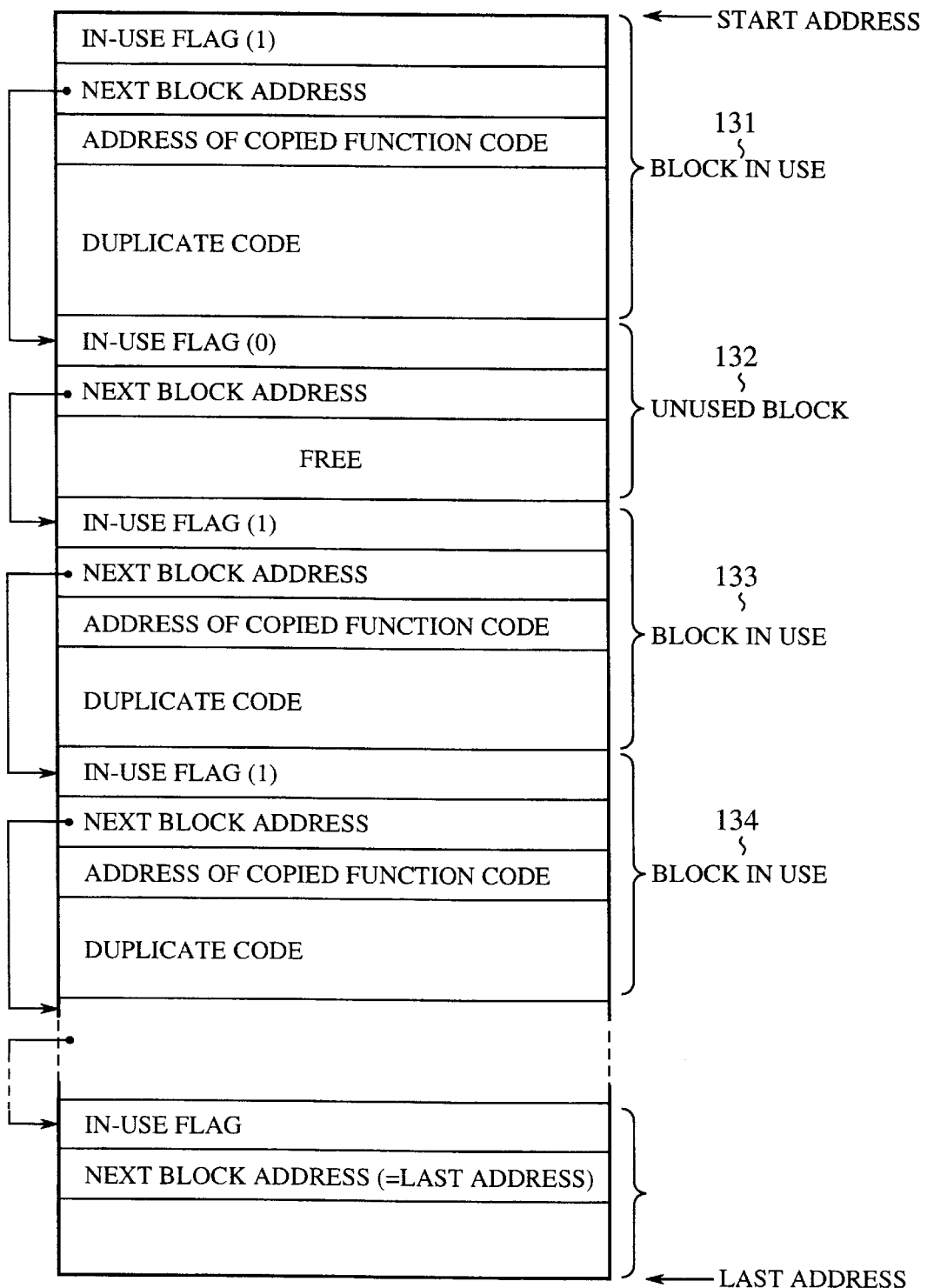
FIG. 13 shows a data structure built in the fast memory and employed in the program execution system according to a second embodiment of the present invention.

FIG. 13 shows a data structure built in the fast memory and used in the program execution system according to a second embodiment of the present invention. Referring to FIG. 13, numerals 131, 133 and 134 indicates blocks in use and 132 indicates an unused block. Each of the blocks includes areas for an in-use flag, a next block address, a source address of a copied function, and a duplicate code.

The program execution system according to the second embodiment has the same construction as that of the first embodiment. Reference numerals apply consistently and the description thereof is omitted. In the description of the second embodiment, the sizes of the function code duplicated in the fast memory 4 is assumed to be identical, as in the first embodiment.

A description will now be given of the operation according to the second embodiment.

Figure 14:
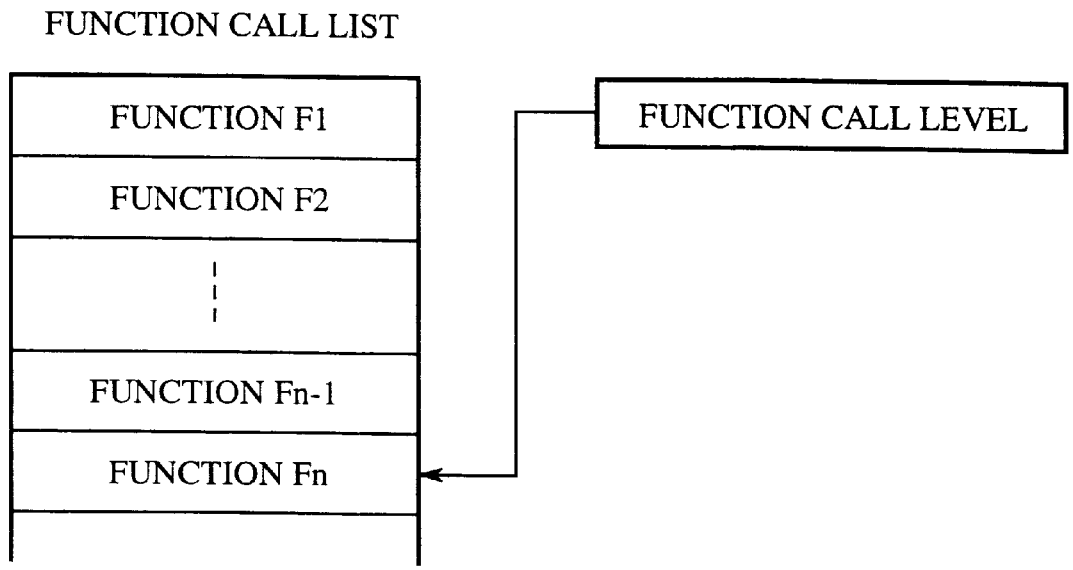
FIG. 14 shows a structure of a function call list.
Figure 15:
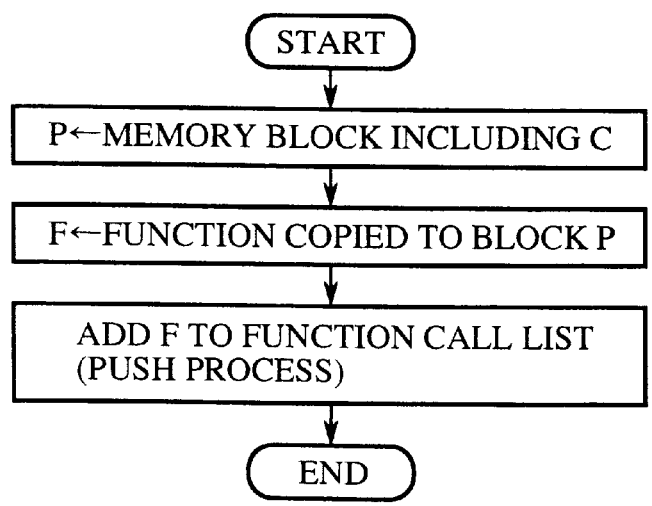
FIG. 15 is a flowchart showing an execution mark setting process.

FIG. 14 shows a structure of a function call list. FIG. 15 is a flowchart showing an execution mark setting process. The execution mark setting process of FIG. 15 is performed in place of the execution mark setting process according to the first embodiment shown in FIG. 3B.

FIG. 16A is a flowchart showing an execution mark release process; and FIG. 16B is a flowchart showing an execution determination process. The execution mark release process of FIG. 16A and the execution determination process of FIG. 16B are performed in place of the execution mark release process of FIG. 3D and the execution determination process of FIG. 3C, respectively.

FIG. 17 shows a sample program executed by the program execution system according to the second embodiment. FIG. 18 shows a status of function codes duplicated in the fast memory 4 when the program shown in FIG. 17 is executed by the program execution system according to the second embodiment.

In the second program execution system according to the second embodiment, the execution mark setting process in step ST35-1 is performed in accordance with the subroutine shown in FIG. 15. More specifically, when a function code is read from the fast memory 4 (cache hit) or when a block in the fast memory 4 is allocated for a function code and the function code is duplicated therein, the function code is added to the function call list shown in FIG. 14.

Referring to FIG. 15, the pointer P is placed at the address of the data block containing the code indicated by C. The variable F is set to the function code copied to the block P. The code indicated by F is then added to the function call list as shown in FIG. 14. As illustrated in FIG. 14, the function code Fn which is read most recently is given the highest priority.

In the second embodiment, the execution mark release process in step ST35-3 of FIG. 3A is performed in accordance with the subroutine shown in FIG. 16A. In the execution mark release process of FIG. 16A, the function code is removed from the function call list shown in FIG. 14. The execution determination process according to the second embodiment shown in FIG. 16B is performed in step ST93 of the purge process shown in FIG. 9 described in the first embodiment. In the execution determination process of FIG. 16B, the variable F is set to the function copied to the block P. A determination is then made as to whether the function code indicated by F is located in the function call list. Upon an affirmative answer, a determination is made that the function code is being executed. Upon a negative answer, a determination is made that the function code is not being executed.

Referring to (6) and (7) of FIG. 18, the duplicate of the function code F3 is removed from the fast memory 4 so that the function code F5 is duplicated in its place. Referring to (15) of FIG. 18, the duplicate of the function code F3 is removed from the fast memory 4 so that the function code F5 is duplicated in its place.

As has been described, according to the second embodiment, a duplicate of the function code already executed is removed from the fast memory 4 as a requirement therefor arises. When the size of the fast memory 4 is smaller than that of the program executed, blocks already containing duplicate function codes are appropriately released so that additional duplicates of function codes are created. It is thus ensured that none of the target function codes suffers a delay in execution.

Embodiment 3

Figure 19:
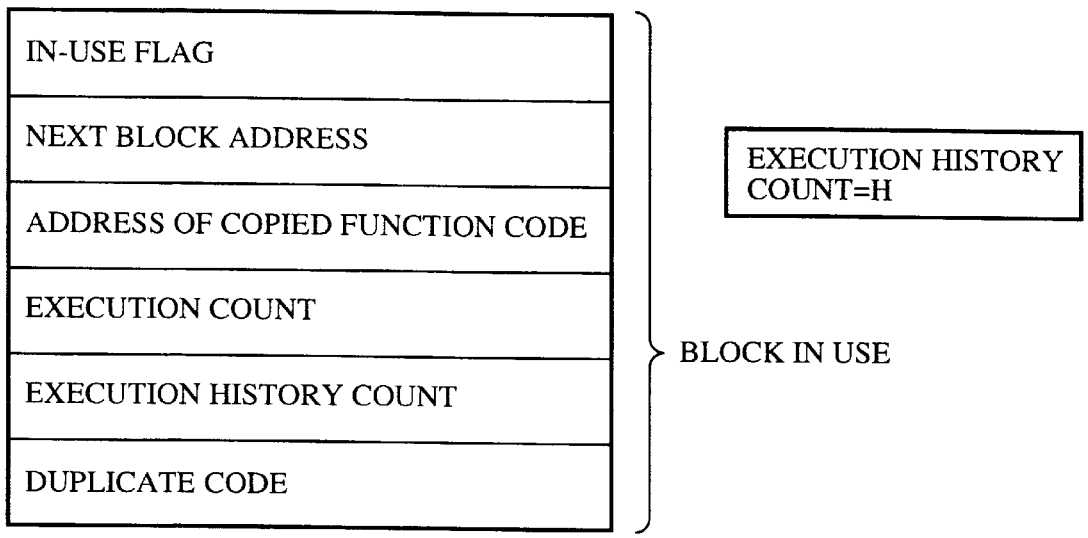
FIG. 19 shows a data structure of a block in use in the fast memory, employed by the program execution system according to a third embodiment of the present invention.

FIG. 19 shows a data structure of a block in use in the fast memory 4, employed by the program execution system according to a third embodiment of the present invention. The block in use according to the third embodiment includes areas for a in-use flag, a next block address, an address of a copied function code, an execution count, an execution history count and a duplicate code. The execution history count (indicated by H) is a global count provided to specify the order of execution of function calls. An incremental count is given to each executed function code in the fast memory 4 whenever control is returned to the calling function code (see FIG. 23).

The program execution system according to the third embodiment has the same construction as that of the first embodiment. Reference numerals apply consistently and the description thereof is omitted. In the description of the third embodiment, the sizes of the function code duplicated in the fast memory 4 are assumed to be identical, as in the first embodiment.

A description will now be given of the operation according to the third embodiment.

Figure 20:
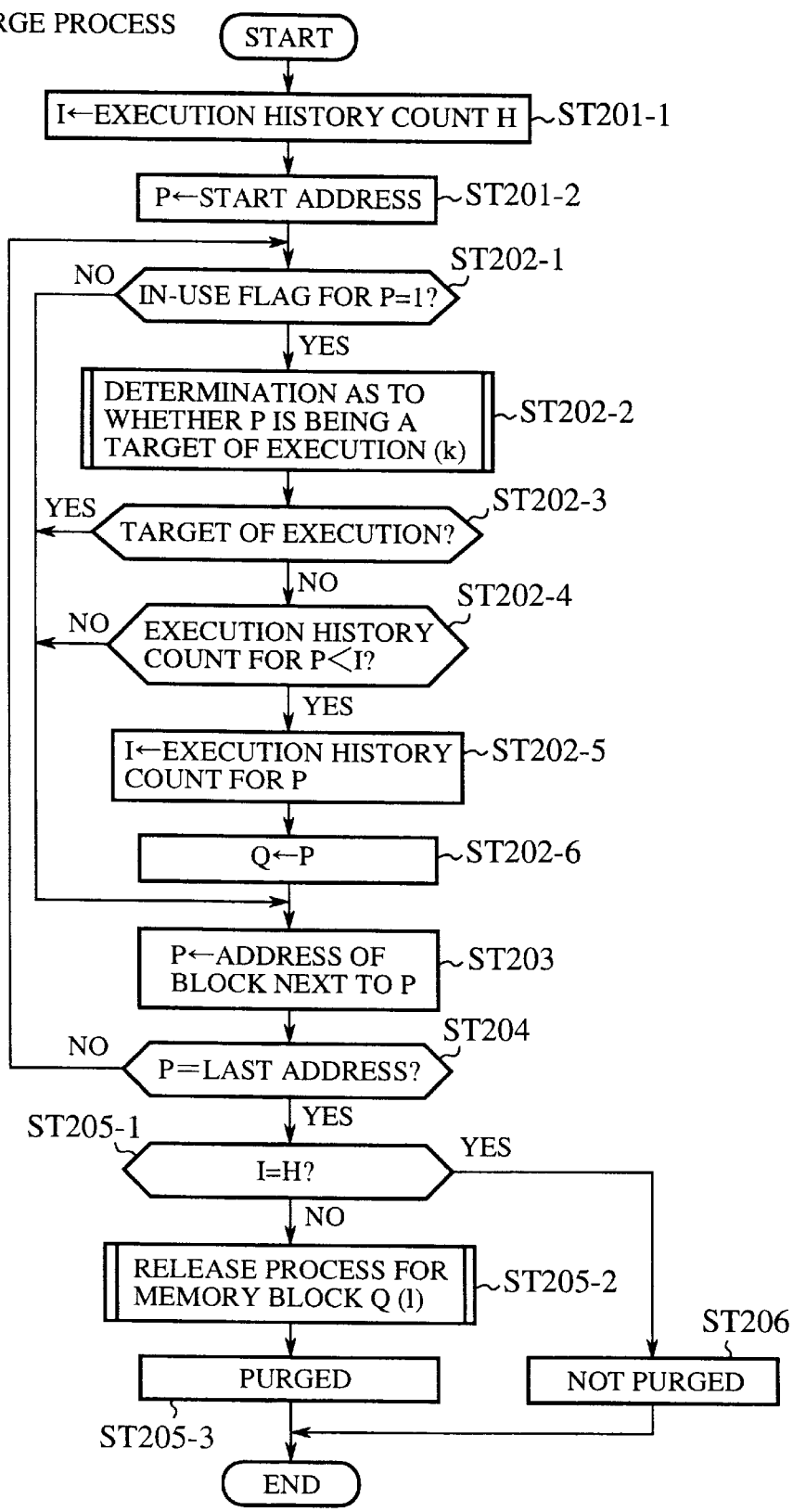
FIG. 20 is a flowchart showing a purge process performed by the program execution system according to the third embodiment.

FIG. 20 is a flowchart showing a purge process of the program execution system according to the third embodiment. The purge process of FIG. 20 is performed in place of the purge process according to the first embodiment shown in FIG. 9. FIG. 21 is a flowchart showing a return process of the program execution system according to the third embodiment. The return process of FIG. 21 is performed in place of the return process according to the first embodiment shown in FIG. 7. The other aspects of operation according to the third embodiment are the same as the corresponding aspects of the first embodiment described with reference to FIGS. 3A through 6, 8, 10 and 11.

Figure 24:
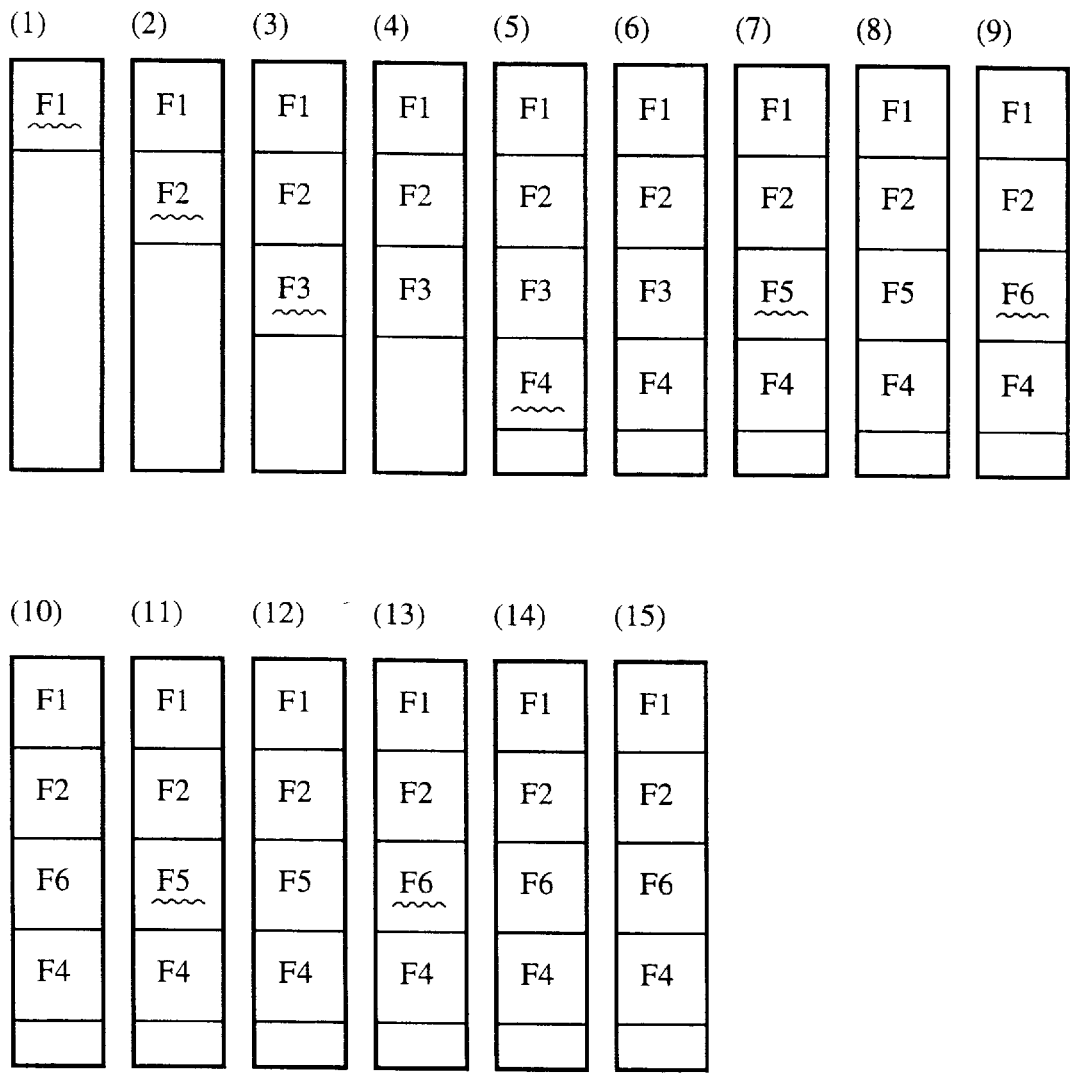
FIG. 24 shows a status of function codes duplicated in the fast memory when the program shown in FIG. 22 is executed by the program execution system according to the first embodiment or the program execution system according to the second embodiment.

FIG. 22 is a sample program executed by the program execution system according to the third embodiment. FIG. 23 shows a status of function codes duplicated in the fast memory 4 when the program shown in FIG. 22 executed by the program execution system according to the third embodiment. FIG. 24 shows a status of function codes duplicated in the fast memory when the program shown in FIG. 22 is executed by the program execution system according to the first embodiment or the program execution system according to the second embodiment.

The operation of the program execution system according to the third embodiment is basically the same as that of the first embodiment or the second embodiment. However, in the purge process according to the third embodiment, the execution history count of the function codes duplicated in the fast memory 4 is checked so that blocks are released in the ascending order of the execution history count. That is, the oldest duplicate function code executed is removed first. This is in compliance with the notion that a function code executed recently has a greater chance of being executed additional times than the code in the fast memory 4 that remain there for a relatively long period of time.

Referring to FIG. 20, the forthcoming execution history count H (i.e. the execution history count to be given to a block next time the function code therein is executed) is substituted into a variable I in step ST201-1. In step ST201-2, the pointer P is placed at the start address, whereupon a determination is made in step ST201-2 as to whether the in-use flag for the block indicated by P is set to "1". Upon an affirmative answer, the subroutine of FIG. 16B is executed in step ST202-2. If it is determined that the block P is being a target for execution in step ST202-3, control is turned to step ST203. If it is determined in step ST202-3 that the block P is not being a target for execution, a determination is made in step ST202-4 as to whether the execution history count for the block P is lower than the execution history count indicated by I. Upon a negative answer, control is turned to step ST203. If it is determined that the execution history count for the block P is lower than the count indicated by I, the execution history count for the block P is substituted into the variable I. Subsequently, the pointer Q is placed at the block P in step ST202-6, whereupon control is turned to step ST203. In step ST203, the pointer P is placed at the next block address. Subsequent to step ST203, a determination is made in step ST204 as to whether the pointer P indicates the last address. Upon a negative answer, control is returned to step ST202-1.

Steps ST201-1 through ST202-6 are executed to determine the block Q with the oldest history of execution, that is, to determine a block containing the oldest function code executed.

If it is determined in step ST204 that the last address has been reached, a determination is made in step ST205-1 as to whether a relation I=H holds. Upon a negative answer, the memory release process is performed in step ST205-2 in the block indicated by Q according to the subroutine shown in FIG. 10. Subsequent to step ST205-2, a determination that the purge process is successful is given in step ST205-3. If an affirmative answer is yielded in step ST205-1, a determination that the purge process is unsuccessful is given in step ST206.

The return process of FIG. 21, which is performed in place of the return process according to the first embodiment shown in FIG. 7 will now be described.

In step ST211, the execution history count for the block P is set to the count H. Subsequently, in step ST212, the value H+1 is substituted into the count H so that the count H again denotes the "forthcoming" execution history count. Subsequently, control is returned to the source of call in step ST213.

Referring to (8) and (9) of FIG. 24, the block for the function code F5 is released in order to create the duplicate of the function code F6. Likewise, referring to (12) and (13) of FIG. 24, the block for the function code F5 is released in order to create the duplicate of the function code F6.

Referring to (8) and (9) of FIG. 23, the duplicate of the function code F4 is removed from the fast memory 4 in order to create the duplicate of the function code F6.

Thus, the third embodiment serves to ensure that the code duplication process occurs less frequently than the first and second embodiments, by ensuring that the execution history count for each of the blocks in the fast memory 4 is referred to in order to determine a block containing a code with the oldest history of execution, that is, to determine a block to be removed first.

Embodiment 4

Figure 25:
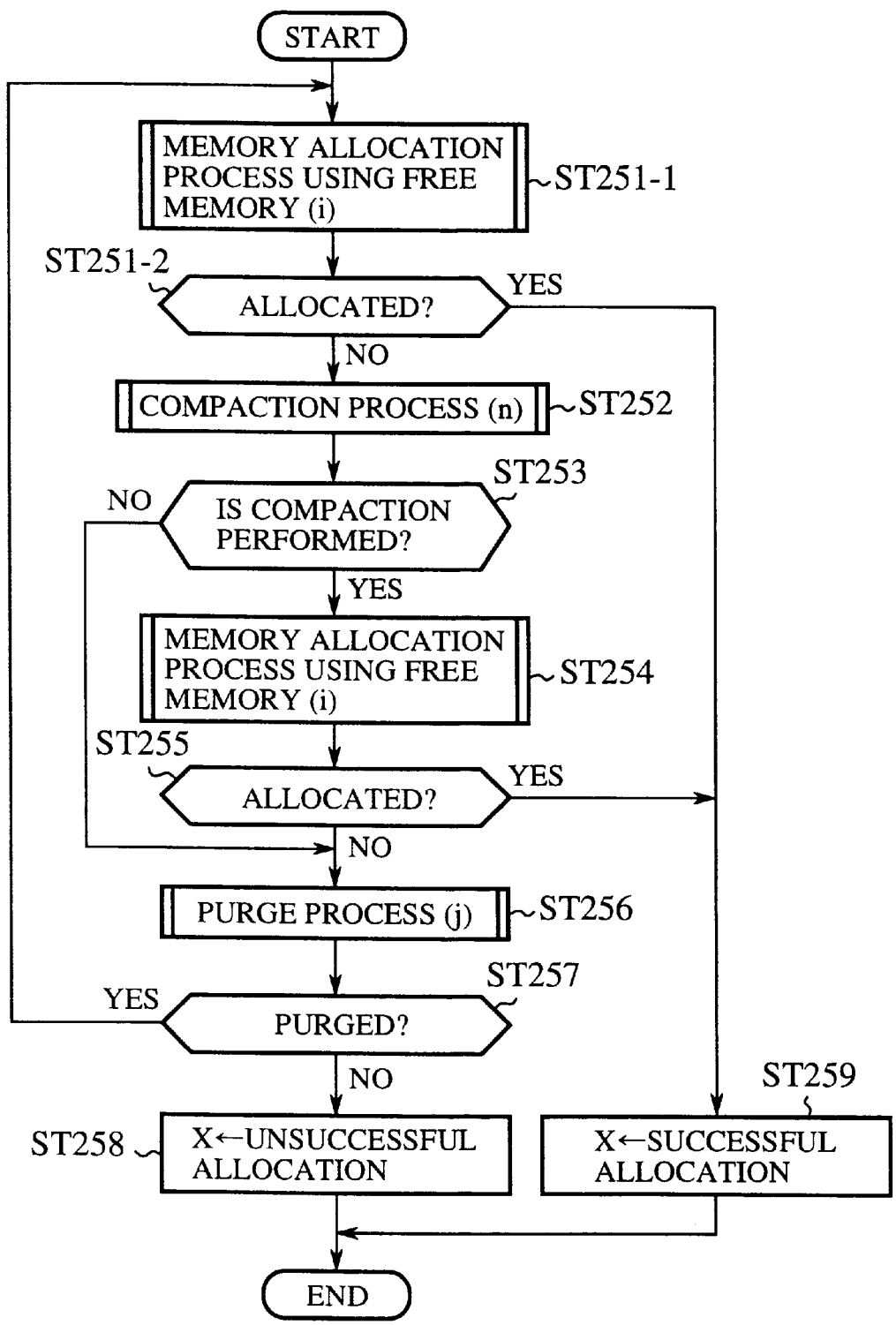
FIG. 25 is a flowchart showing a memory allocation process performed by the program execution system according to a fourth embodiment of the present invention.

FIG. 25 is a flowchart showing a memory allocation process executed by the program execution system according to a fourth embodiment of the present invention. The memory allocation process of FIG. 25 is performed in place of the memory allocation process according to the first embodiment shown in FIG. 5.

Figure 26A:
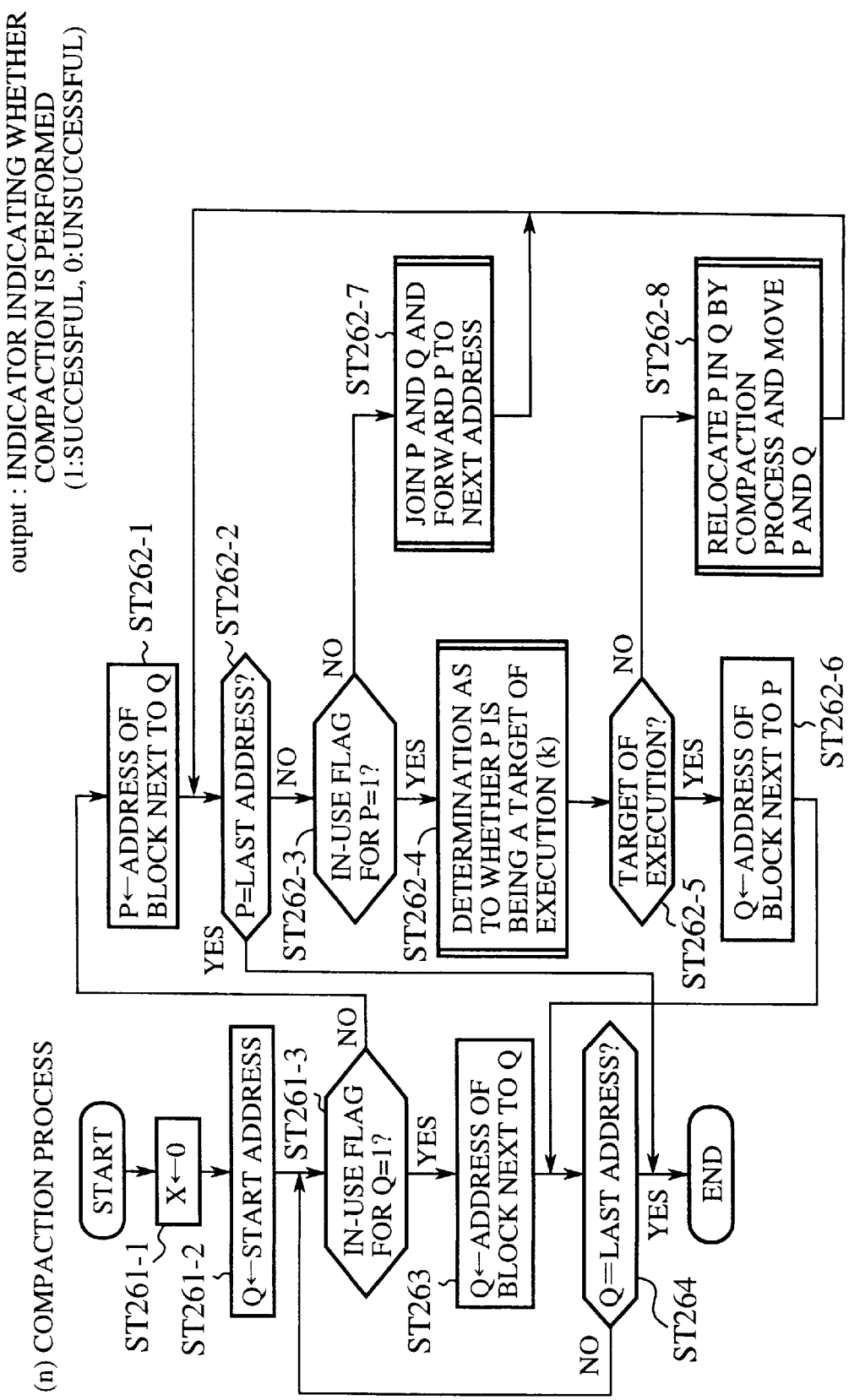
FIG. 26A is a flowchart showing a compaction process performed by the program execution system according to the fourth embodiment.

FIG. 26A is a flowchart showing a compaction process executed by the program execution system according to the fourth embodiment. The compaction process shown in FIG. 26A is performed in step ST252 of the memory allocation process shown in FIG. 25. The other steps of the fourth embodiment are the same as the corresponding steps in the first embodiment.

The program execution system according to the fourth embodiment has the same construction as that of the first embodiment. Reference numerals apply consistently and the description thereof is omitted.

A description will now be given of the operation according to the fourth embodiment.

In the following description, the sample program of FIG. 22 used in the description of the third embodiment will also be used.

In the description of the first through third embodiments, it is assumed that the function codes duplicated in the fast memory 4 have the identical size. However, the fourth embodiment is also applicable to a function codes with different sizes.

Even if the function codes have different sizes, the blocks may be created sequentially provided that the free area is sufficiently large. When the free area is no longer available, blocks containing the function codes which are relatively less frequently called may be released so as to create a free area. Subsequently, duplicates of new function codes may be provided in the free area thus created.

The problem posed here is that the size of the function code to be duplicated may be different from that of the function code already removed. For example, when the function code to be duplicated is smaller in size than the free area, an unused area remains after the duplication. Repetition of the memory release process and the duplication process may result in unused areas distributed in the fast memory 4, leading to a relatively inefficient use of the fast memory 4.

The program execution system according to the fourth embodiment resolves this drawback by performing the compaction process shown in FIG. 26A in step ST252 of FIG. 25, when the allocation of a free area in the fast memory 4 is determined to be a failure in step ST251-2.

Referring to FIG. 26A, the value "0" is substituted into a variable X in step ST261-1. The variable X is provided to contain an indicator value indicating whether the compaction is successful. The successful compaction may be indicated by "1" and the failure of compaction may be indicated by "0". The pointer Q is placed at the start address in step ST261-2. In step ST261-3 that follows, a determination is made as to whether the in-use flag for the block indicated by Q is set to "1". Upon an affirmative answer, the pointer Q is placed at the next block. In step ST264, a determination is made as to whether the address indicated by Q is the last address. If the last address has not been reached, control is returned to step ST261-3. If the last address has been reached, the process is terminated.

If it is determined in step ST261-3 that the block indicated by Q is unused, the pointer P is placed at the next block address for the block Q in step ST262-1. A determination is made in step ST262-2 as to whether the address indicated by P is the last address. If the last address has not been reached, a determination is made in step ST262-3 as to whether the in-use flag for the block P is set to "1". Upon an affirmative answer, the execution determination process shown in FIG. 16B is performed in step ST262-4. If it is determined that the block P is a target of execution in step ST262-5, the pointer Q is placed to the block indicated as the next block in the block P in step ST262-6, whereupon control is turned to step ST264. Upon a negative answer in step ST262-3, the block P and the block Q are jointed to each other and the pointer P is forwarded to the next block address in step ST262-7. Step ST262-7 is provided to join adjacent free data blocks.

When it is determined in step ST262-5 that the block P is in use but not a target of execution, the block P is relocated in the block Q and the pointers P and Q are subsequently moved in step ST262-8 according to the subroutine shown in FIG. 26C.

Figure 26B:
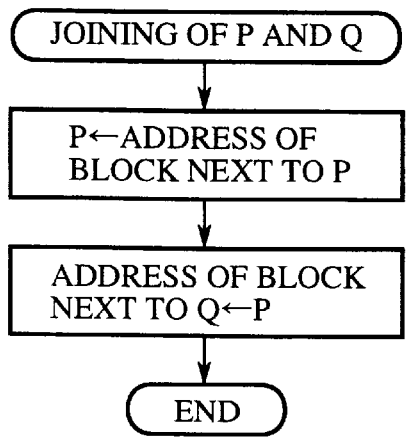
FIG. 26B is a flowchart showing an joining process for joining two adjacent unused blocks.

Referring to FIG. 26B, joining of the blocks P and Q in step ST262-7 is more specifically performed such that the pointer P is first placed at the next block address. The next block address for the block Q is then set to the address pointed to by the pointer P. This is to ensure that the joined block continues to the next block without an intervening free area.

Figure 26C:
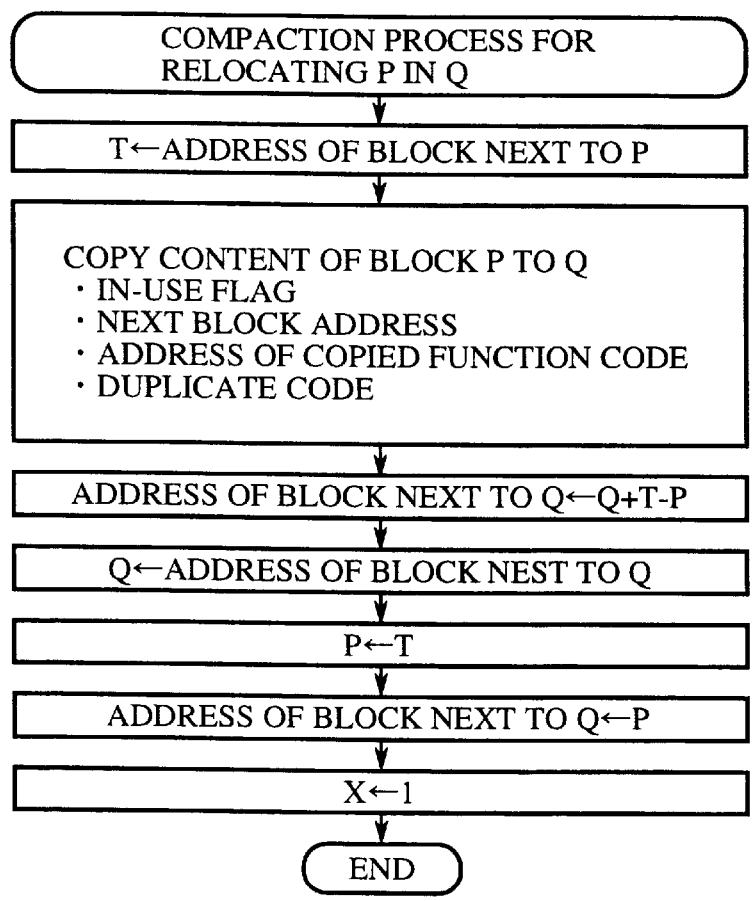
FIG. 26C is a flowchart showing a compaction process for relocating a block in use in an unused block.

Referring to FIG. 26C, the compaction process for relocating the block P in the block Q is performed such that the pointer T is placed to the next block address for the block P. Subsequently, the content of the block P, including the in-use flag, the next block address, the original address of the duplicated function code, and the duplicate code itself, is copied to the block Q. The next block address for the block Q is then set to the value indicated by Q+T−P.

Subsequently, the pointer Q is placed at the next block address. Further, the pointer P is placed at the address indicated by T. As a result, the pointers P and Q are forwarded.

Subsequently, the next block address for the block pointed to by Q is set to the block pointed to by P, resulting in a contiguous area comprising the blocks Q and P and displaced from the original contiguous area. At the end, the variable X is set to "1". When the process of FIG. 26C is complete, control is returned to step ST262-2.

When the compaction process of FIG. 26A is complete, control is turned to step ST253 in FIG. 25 where a determination is made as to whether the compaction is successful. If the compaction is successful, the free memory allocation process illustrated in FIG. 8 is performed. The rest of the steps of FIG. 25 are the same as the corresponding steps of FIG. 5 and the description thereof is omitted.

The compaction process according to the fourth embodiment ensures that adjacent free areas (blocks) in the fast memory 4 are joined together so as to create a larger free area. Accordingly, the frequency of relocation of function codes in the fast memory 4, that is, the number of times that function codes are replaced is reduced so that the processing time required due to the replacing is reduced.

Figure 27:
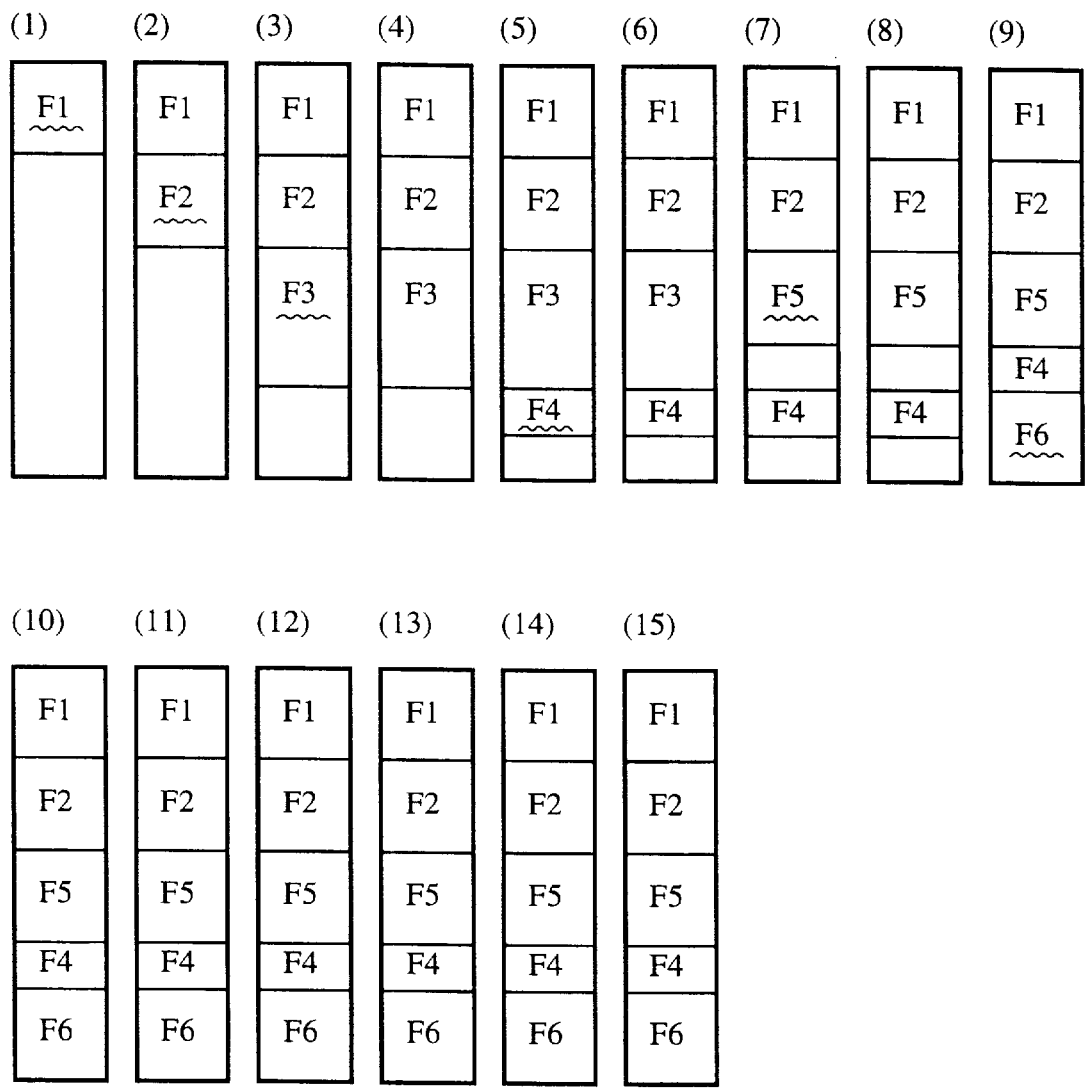
FIG. 27 shows a status of function codes duplicated in the fast memory when the program shown in FIG. 22 is executed by the program execution system according to the fourth embodiment.

FIG. 27 shows a status of function codes duplicated in the fast memory 4 when the program shown in FIG. 22 is executed by the program execution system according to the fourth embodiment; and FIG. 28 shows a status of function codes duplicated in the fast memory 4 when the program shown in FIG. 22 is executed by the program execution system according to the first embodiment or the program execution system according to the second embodiment.

Referring to (8) and (9) of FIG. 28, the duplication of the function code F5 is removed so as to make room for the duplicate of the function code F6. However, because of the difference in size between the function code F5 and the function code F3 that it replaces, there is created an unused area between the function code F6 in (9) and the function code F4 already copied. As a result, a total of eight duplication processes are required when the program shown in FIG. 22 is executed by the system of the first embodiment or the second embodiment.

As shown in (8) and (9) of FIG. 27, according to the compaction process, the duplicate of the function code F4 is placed next to the block containing the function code F5 before the function code F6 is duplicated. Thereby, an unused area is eliminated such that the block containing the function code F4 is contiguous with that of the function code F6. Only six duplication processes for duplicating function codes in the fast memory 4 are required when the program shown in FIG. 22 is executed by the program execution system according to the fourth embodiment.

Thus, the program execution system according to the fourth embodiment ensures that, when function codes have different sizes, adjacent free areas are joined together to create a larger free area. Accordingly, in addition to the benefit provided by the first and second embodiment, the fourth embodiment ensures that the frequency of the function code relocation process, that is, the number of times that the replacing of function codes is performed is reduced. Consequently, the processing time required for replacing operations is reduced.

Embodiment 5

Figure 29:
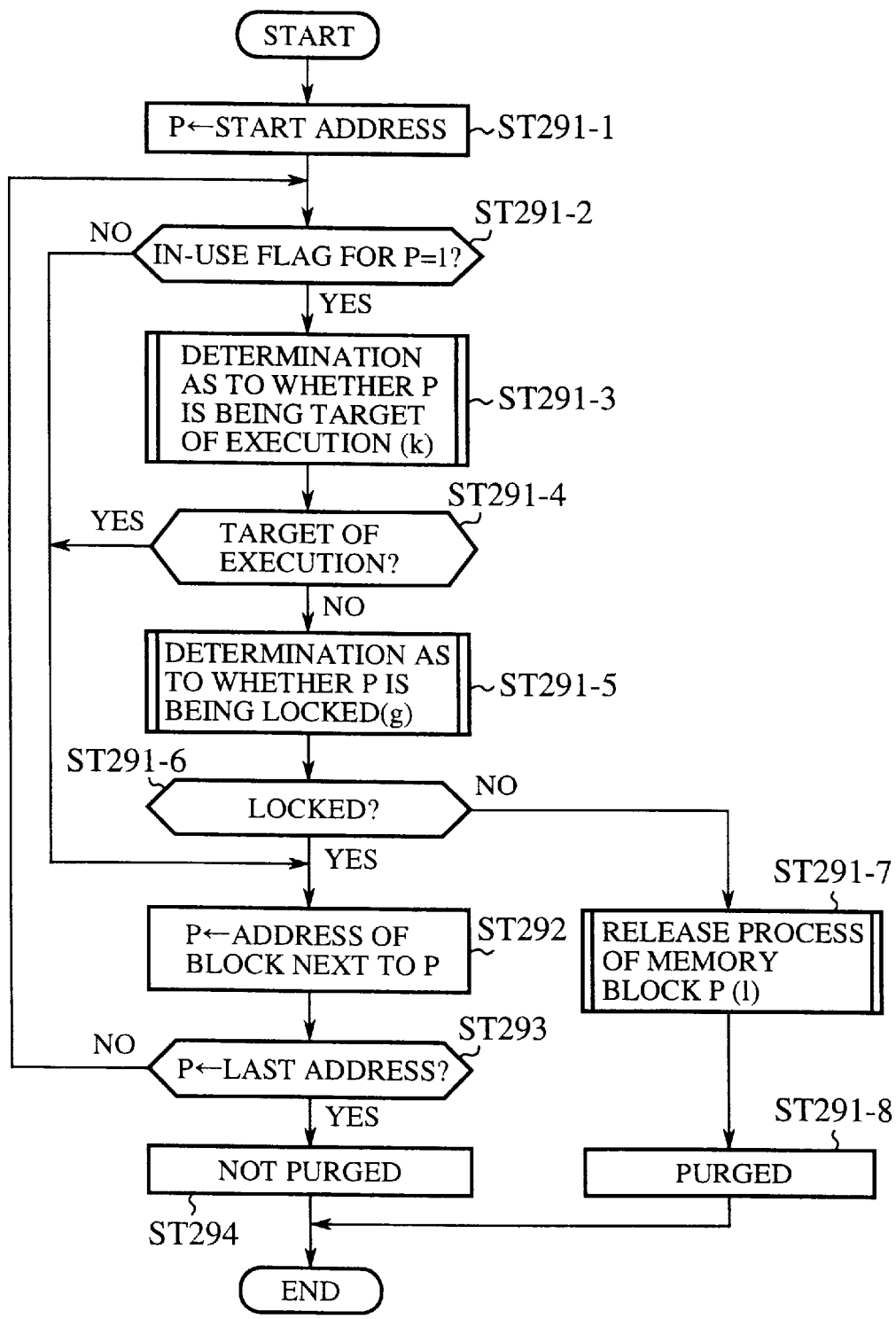
FIG. 29 is a flowchart showing a purge process performed by the program execution system according to a fifth embodiment of the present invention.

FIG. 29 is a flowchart showing a purge process executed by the program execution system according to a fifth embodiment of the present invention; FIG. 30A is a table listing lock flags for respective functions; FIG. 30B is a flowchart showing a lock determination process executed by the program execution system according to the fifth embodiment; FIG. 30C is a flowchart showing a lock process executed by the program execution system according to the fifth embodiment; and FIG. 30D is a flowchart showing a lock release process performed by the program execution system according to the fifth embodiment.

The program execution system according to the fifth embodiment has the same construction as that of the first embodiment. Reference numerals apply consistently and the description thereof is omitted.

A description will now be given of the operation according to the fifth embodiment In the fifth embodiment, the purge process shown in FIG. 29 is performed in place of the purge process according to the first embodiment shown in FIG. 9.

The purge process of FIG. 29 differs from that of FIG. 9 in that the steps ST291-5 and ST291-6 related to determination of a lock status are provided. The rest of the steps are the same as the corresponding steps of FIG. 9 and the description thereof is omitted.

Referring to FIG. 30A, in the program execution system according to the fifth embodiment, a lock flag set to either "1" or "0" is provided for each of the function codes depending on whether or not a lock is set for the code. The lock flag of an important function code may be set to "1" in accordance with the lock process illustrated in FIG. 30C in order to prevent it from being removed from the fast memory 4 in the purge process. To cancel the lock status of a function code, the lock flag is set to "0" as illustrated in FIG. 30D.

Determination of the lock status in step ST291-5 is detailed in FIG. 30B.

FIG. 31 shows a sample program executed by the program execution system according to the fifth embodiment; FIG. 32A shows a table listing lock flags for respective functions; FIG. 32B shows a status of function codes duplicated in the fast memory when the program shown in FIG. 31 is executed by the program execution system according to the fifth embodiment; and FIG. 32C shows a status of function codes duplicated in the fast memory when the program shown in FIG. 31 is executed by the program execution system according to the first embodiment or the program execution system according to the second embodiment.

As demonstrated by (6) of FIG. 32B, before the function code F4 is duplicated, the block containing the function code F2 is checked to determine if the function code F2 is locked. Since the function code F2 is locked as shown in FIG. 32A, the block for the function code F3 which is not locked is released to provide room for the duplicate function code F4. As a result, a total of four duplication processes are performed according to the fifth embodiment, whereas a total of five duplication processes are performed according to the first or second embodiment.

Thus, according to the fifth embodiment, a function code predicted to be important is locked using a lock flag. Therefore, in addition to the benefit provided by the first and second embodiments, the fifth embodiment serves to ensure that the frequency of relocation, that is, the number of times that function codes are replaced is reduced. Consequently, the processing time required for replacing operations is reduced.

Embodiment 6

Figure 33:
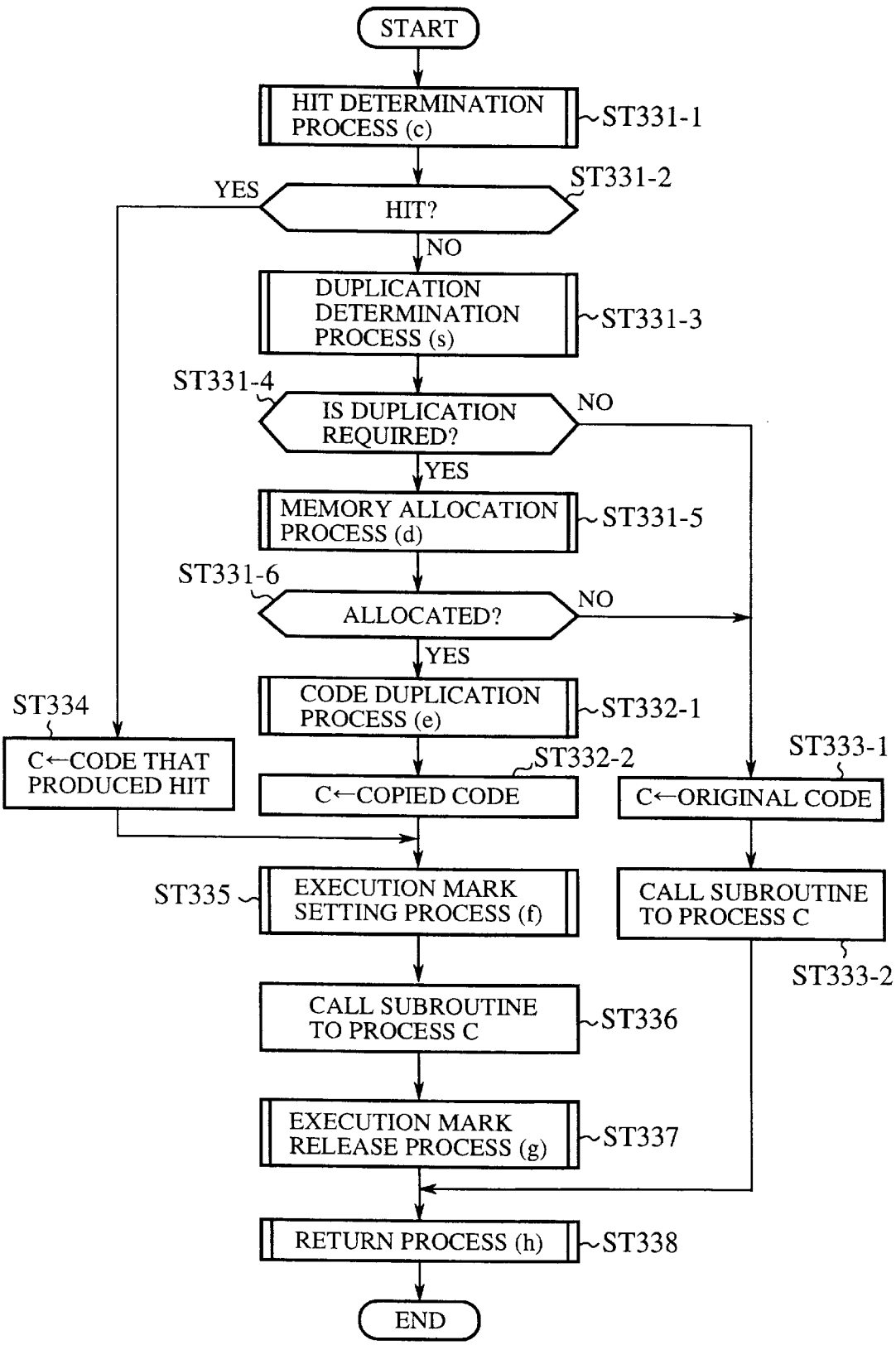
FIG. 33 is a flowchart showing a function call process executed by the program execution system according to a sixth embodiment of the present invention.
Figures 34A, 34B:
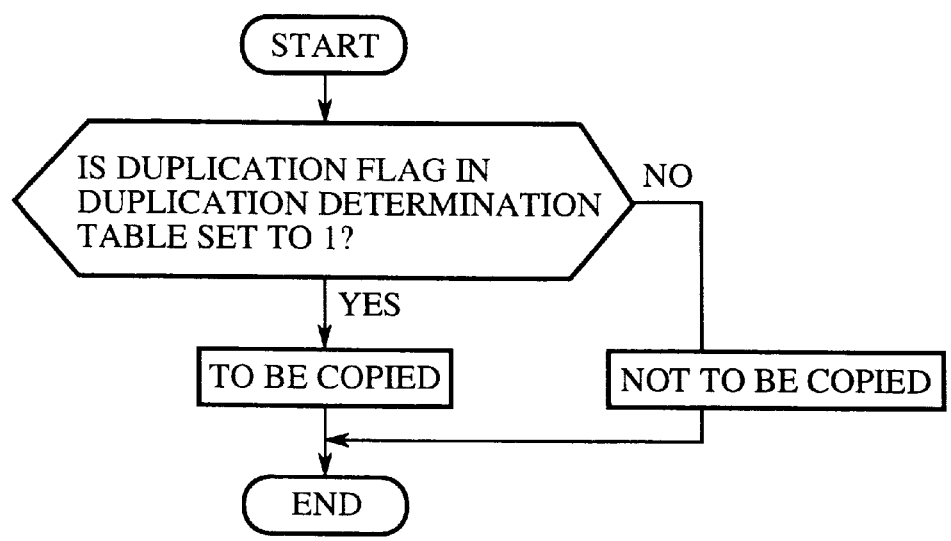
FIG. 34A shows a table listing duplication flags for respective functions.
FIG. 34B is a flowchart showing a duplication determination process executed by the program execution system according to the sixth embodiment.

FIG. 33 is a flowchart showing a function call process executed by the program execution system according to a sixth embodiment of the present invention; FIG. 34A shows a table listing duplication flags for respective functions; and FIG. 34B is a flowchart showing a duplication determination process executed by the program execution system according to the sixth embodiment.

The program execution system according to the sixth embodiment has the same construction as that of the first embodiment. Reference numerals apply consistently and the description thereof is omitted.

A description will now be given of the operation according to the sixth embodiment.

In the sixth embodiment, the function call process shown in FIG. 33 is performed in place of the function call process according to the first embodiment shown in FIG. 3A. The function call process of FIG. 33 differs from that of FIG. 3A in that steps ST331-3 and ST331-4 related to duplication determination are provided. The rest of the steps are the same as the corresponding steps of FIG. 3A and the description thereof is omitted.

In the duplication determination process in step ST331-3, the table shown in FIG. 34A is referred to. Referring to FIG. 34A, a duplication flag for an associated function code is set to either "1" or "0". For example, a function code determined to be not so important is assigned a duplication flag of "0" so as to prevent the code from being duplicated in the fast memory 4.

The duplication determination process in step ST331-3 is performed subsequent to the hit determination process. In the duplication determination, the duplication determination table of FIG. 34A is referred to in order to determine whether a duplication of a function code in the fast memory 4 is required according to the flowchart of FIG. 34B. Referring to FIG. 34B, if it is determined that the duplication flag in the duplication determination table is set to "1", it is determined that the duplication is required. If the duplication flag is set to "0", it is determined that the duplication is not required. The result of duplication determination is checked in step ST331-4 of FIG. 33. If the duplication is required, control is turned to step ST331-5 where the memory allocation is performed. If the duplication is not required, control is turned to step ST333-1.

Figures 35A, 35B:
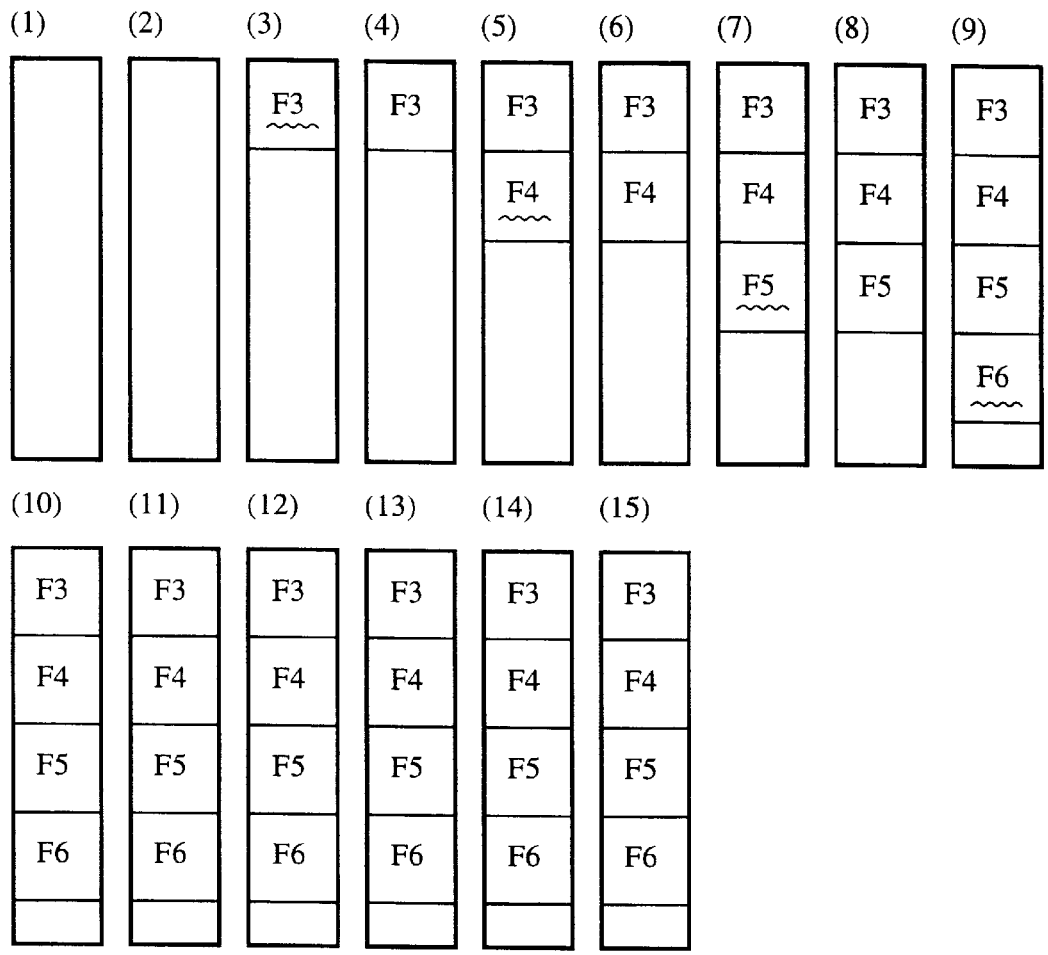
FIG. 35A shows a status of function codes duplicated in the fast memory when the program shown in FIG. 22 is executed by the program execution system according to the sixth embodiment.
FIG. 35B shows a table listing duplication flags for respective functions.

FIG. 35A shows a status of function codes duplicated in the fast memory 4 when the program shown in FIG. 22 is executed by the program execution system according to the sixth embodiment; and FIG. 35B shows a table listing duplication flags for respective functions.

FIG. 35A demonstrates that, according to the sixth embodiment, function codes are duplicated in the fast memory 4 four times. In contrast, the program execution system according to the third embodiment duplicates function codes eight times, as shown in FIG. 24.

Thus, according to the sixth embodiment, a predetermined flag value is set for a function code predicted not to be so important so as to prevent the function code from being duplicated in the fast memory 4. Accordingly, in addition to the benefit of the first and second embodiments, the sixth embodiment serves to ensure that the frequency of function code relocation in the fast memory 4, that is, the number of times that replacing operations are performed is reduced. Consequently, the processing time required for replacing operations is reduced.

Embodiment 7

FIG. 36A is a table listing frequency of calls and predetermined frequency of calls required to trigger duplication, for respective functions; and FIG. 36B is a flowchart showing a duplication determination process executed by the program execution system according to the seventh embodiment of the present invention. In the seventh embodiment, the duplication determination process shown in FIG. 36B is performed in place of the duplication determination process according to the sixth embodiment shown in FIG. 34B. The other aspects of the operation of the seventh embodiment are the same as the corresponding aspects of the first and sixth embodiments. The program execution system according to the seventh embodiment has the same construction as that of the first embodiment. Therefore, reference numerals apply consistently and the description thereof is omitted.

A description will now be given of the operation according to the seventh embodiment.

As shown in FIG. 36A, a duplication determination table is provided to list, for each of the function codes, the number of times that a function code was called and the number of times that the function code should be called before a duplication process is required. For example, referring to FIG. 36A, the function code F1 has not been called so far and the number of times required to trigger a duplication of the function code F1 is designated as C1.

Referring to FIG. 36B, when the program execution system according to the seventh embodiment calls a function code, the number of times called listed for that function code is incremented by one in step ST361. If it is determined in step ST362 that the number of times that the function codes was called does not exceed the number of times triggering duplication, a determination that the duplication is not required is given in step ST363. In the opposite case, a determination that the duplication is required is given in step ST364.

Figures 38A, 38B:
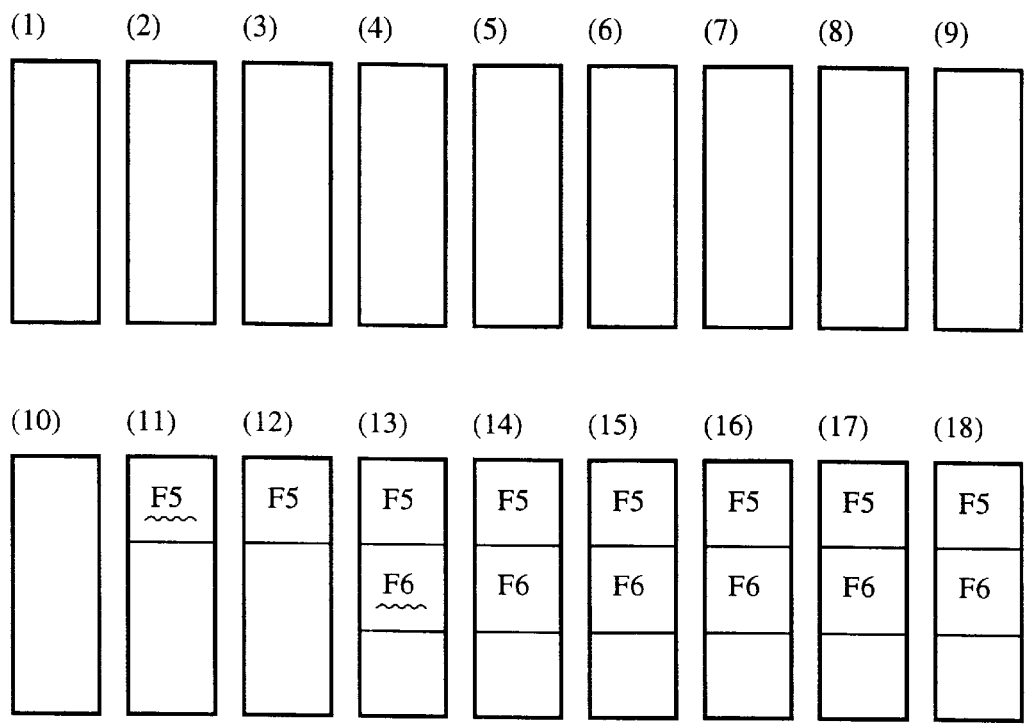
FIG. 38A shows a status of function codes duplicated in the fast memory when the program shown in FIG. 37 is executed by the program execution system according to the seventh embodiment.
FIG. 38B shows a table listing predetermined frequency of calls required to trigger duplication for respective functions.
Figure 39:
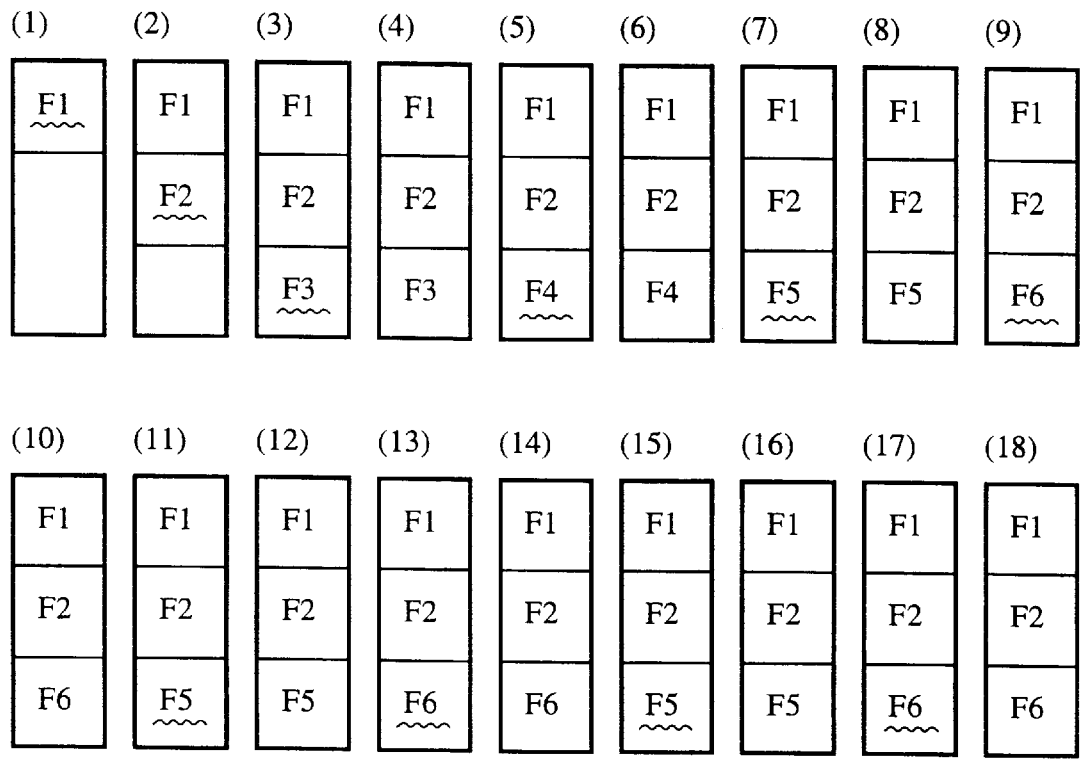
FIG. 39 shows a status of function codes duplicated in the fast memory when the program shown in FIG. 37 is executed by the program execution system according to the first embodiment or the program execution system according to the second embodiment.
Figure 40:
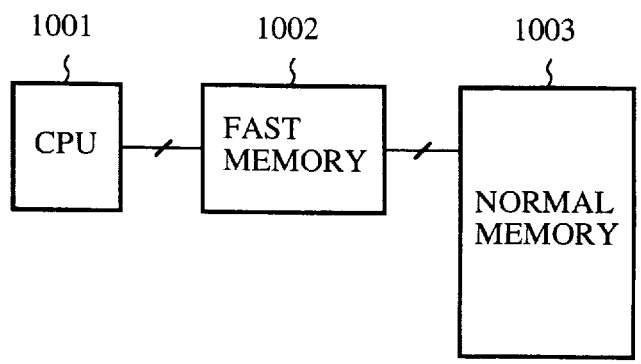
FIG. 40 is a block diagram showing a program execution system according to the related art.

FIG. 37 shows a sample program executed by the program execution system according to the seventh embodiment; FIG. 38A shows a status of function codes duplicated in the fast memory 4 when the program shown in FIG. 37 is executed by the program execution system according to the seventh embodiment; and FIG. 38B shows a table listing the number of times that a function should be called in order to trigger duplication of the functions. FIG. 39 shows a status of function codes duplicated in the fast memory when the program shown in FIG. 37 is executed by the program execution system according to the first embodiment or the program execution system according to the second embodiment.

As shown in FIG. 38A, duplication of a function code in the fast memory 4 takes place twice when the program execution system according to the seventh embodiment executes the program shown in FIG. 37. In contrast, duplication of a function code takes place ten times when the program execution system according to the first embodiment or the second embodiment executes the program shown in FIG. 37, as shown in FIG. 39.

As described above, according to the seventh embodiment, duplication of function codes is controlled so that the function code with a frequency of calls lower than a predetermined frequency is prevented from being duplicated in the fast memory 4. Only those function codes with a frequency of calls exceeding the predetermined frequency are duplicated in the fast memory 4. Thus, in addition to the benefit of the first and second embodiments, the seventh embodiment adds an advantage that function codes with a high frequency of calls are executed efficiently. As a result, the processing time of a program is reduced.

The present invention is not limited to the above-described embodiments, and variations and modifications may be made without departing from the scope of the present invention.

What is claimed is:

1. A program execution system comprising:
   first storage means provided with permanent addresses located in a memory space and characterized by a relatively fast access;
   second storage means for storing a program, provided with permanent addresses located in the memory space and characterized by a comparatively slower access;
   control means for decoding the program and outputting a decoded result to an instruction execution means; wherein
   said control means further comprises:
      hit determination means for determining, when a function code in the program is called, whether a duplicate of the function code, originally residing in said second storage means, is located in said first storage means;
      memory allocation means for allocating a free block for storing the duplicate of the function code;
      memory release means for releasing a block created in said first storage means so as to create the free block;
      code duplicating means for creating a duplicate of the function code in said free block created by said memory release means in said first storage means;
      release determination means for determining whether the duplicate of the function code created in said first storage means can be removed from said first storage means; and
      release resolution means for determining which of the function codes determined to be ready for removal should be removed from said first storage means; and wherein
   said control means effects control such that, when the function code is called, the duplicate of the function code is read from said first storage means and executed;
   in the absence of the duplicate of the function code, the duplicate of the function code is created in said first storage means so that the instruction execution means executes the function code; and
   the free block capable of storing the duplicate of the called function code is made available after the function code ready for removal is removed from said first storage means.

2. The program execution system according to claim 1, wherein said control means further comprises execution order storage means for storing the order of execution of duplicates of function codes created in said first storage means; and wherein said release resolution means creates the free block by preferentially releasing a block containing the oldest function code executed by referring to the execution order storage means.

3. The program execution system according to claim 1, wherein said control means further comprises relocating means for moving and relocating the duplicate of the function code created in said first storage means; and wherein, by releasing some of the blocks containing function codes determined to be ready for removal are released, and by moving other blocks, unused areas distributed in said first storage means are joined together so as to create a new free block.

4. The program execution system according to claim 1, wherein said control means further comprises lock flag setting means for setting a lock flag to each of the function codes; and wherein said release determination means refers to the lock flag so that the duplicate of the function code having the lock flag thereof set to a predetermined value is prevented from being removed from said first storage means.

5. The program execution system according to claim 1, wherein said control means comprises duplicate flag setting and releasing means for setting a duplicate flag, provided for each of the function codes, to a predetermined value and for releasing the predetermined value; and wherein, when a function code is called, the value of the duplicate flag is referred to so that, only when the duplicate flag is set to the predetermined value, the duplicate of the function code is created in said first storage means so that the function code is executed.

6. The program execution system according to claim 1, wherein said control means further comprises counting means for counting a frequency of calls of the function code; and wherein, when the frequency of calls of the function code is lower than a predetermined count, the function code read from said second storage means is executed, and, when the frequency of calls exceeds the predetermined count, the duplicate of the function code is created in said first storage means so that the function code is executed.

* * * * *